US 12,112,906 B2

(12) United States Patent
Nault et al.

(10) Patent No.: US 12,112,906 B2
(45) Date of Patent: Oct. 8, 2024

(54) INTEGRATED SWITCHGEAR ASSEMBLY

(71) Applicant: G & W ELECTRIC COMPANY, Bolingbrook, IL (US)

(72) Inventors: Brian Stephen Nault, Oak Forest, IL (US); Vincent Marec, Bolingbrook, IL (US); Janet Ache, Bolingbrook, IL (US); Blair S. Kerr, Downers Grove, IL (US); Arturas Dauksas, Oak Lawn, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 418 days.

(21) Appl. No.: 17/508,663

(22) Filed: Oct. 22, 2021

(65) Prior Publication Data
US 2022/0044894 A1    Feb. 10, 2022

Related U.S. Application Data

(63) Continuation-in-part of application No. PCT/US2020/029868, filed on Apr. 24, 2020.
(Continued)

(51) Int. Cl.
*H01H 33/662*  (2006.01)
*H02B 1/36*  (2006.01)
*H01H 33/666*  (2006.01)

(52) U.S. Cl.
CPC ......... *H01H 33/66207* (2013.01); *H02B 1/36* (2013.01); *H01H 2033/6665* (2013.01)

(58) Field of Classification Search
CPC ..... H01H 2033/6665; H01H 33/66207; H01H 1/44; H02B 5/02
See application file for complete search history.

(56) References Cited

U.S. PATENT DOCUMENTS 972,048 A    10/1910  York
2,140,371 A  12/1938  Joseph et al.
(Continued)

FOREIGN PATENT DOCUMENTS

CN    2809846 Y    8/2006
CN    101290846 B   8/2011
(Continued)

OTHER PUBLICATIONS

International Preliminary Report on Patentability for Application No. PCT/US2020/029841 dated Nov. 21, 2021 (10 pages).
(Continued)

*Primary Examiner* — Michael A Matey
(74) *Attorney, Agent, or Firm* — Michael Best & Friedrich LLP

(57) ABSTRACT

An integrated assembly includes a switchgear apparatus for operation at voltages up to 72.5 kV and a mount assembly for coupling to a pole and to support the switchgear apparatus. The mount assembly includes a crossbar, a pole mount, a mounting bracket to support the switchgear apparatus, and a pair of crossbar mounts for supporting the mounting bracket on the crossbar at different positions. Each crossbar mount includes a first arm, a second arm spaced from the first arm and extending parallel to the first arm, a third arm extending between and coupled to a distal end of each of the first and second arms, and a flange extending between and coupled to a proximal end of each of the first and second arms. The flange extends parallel to the third arm. The first, second, and third arms and the flange form an enclosed space to receive the crossbar.

20 Claims, 20 Drawing Sheets

Related U.S. Application Data

(60) Provisional application No. 63/105,705, filed on Oct. 26, 2020, provisional application No. 62/916,019, filed on Oct. 16, 2019, provisional application No. 62/839,278, filed on Apr. 26, 2019.

(56) References Cited

U.S. PATENT DOCUMENTS

| | | | |
|---|---|---|---|
| 2,455,998 A * | 12/1948 | Hoye | H01H 33/76 |
| | | | 218/19 |
| 2,875,381 A | 2/1959 | Chabala | |
| 3,320,377 A | 5/1967 | Yonkers | |
| 3,956,721 A | 5/1976 | Link | |
| 4,124,790 A | 11/1978 | Kumbera et al. | |
| 4,283,610 A | 8/1981 | Date et al. | |
| 4,527,028 A | 7/1985 | Luehring | |
| 4,568,804 A | 2/1986 | Luehring | |
| 4,880,947 A | 11/1989 | Fey et al. | |
| 4,950,854 A | 8/1990 | Green | |
| 5,004,877 A | 4/1991 | Yin | |
| 5,091,616 A * | 2/1992 | Ramos | H01H 33/127 |
| | | | 200/48 R |
| 5,175,403 A | 12/1992 | Hamm et al. | |
| 5,321,221 A | 6/1994 | Rozier | |
| 5,597,992 A | 1/1997 | Walker | |
| 5,645,255 A * | 7/1997 | Parduhn | F21V 21/116 |
| | | | 248/292.12 |
| 5,753,876 A | 5/1998 | Lanning | |
| 5,808,258 A | 9/1998 | Luzzi | |
| 5,834,725 A | 11/1998 | Clarke et al. | |
| 5,912,604 A | 6/1999 | Harvey et al. | |
| 6,130,394 A | 10/2000 | Hoegl | |
| 6,198,062 B1 | 3/2001 | Mather et al. | |
| 6,357,709 B1 * | 3/2002 | Parduhn | G09F 7/18 |
| | | | 248/214 |
| 6,888,086 B2 | 5/2005 | Daharsh et al. | |
| 6,989,498 B1 | 1/2006 | Linder et al. | |
| 7,053,327 B2 | 5/2006 | Benk et al. | |
| 7,133,271 B2 * | 11/2006 | Jonas | H01H 33/027 |
| | | | 361/115 |
| 7,215,228 B2 | 5/2007 | Rhein | |
| 7,488,916 B2 | 2/2009 | Muench et al. | |
| 7,563,161 B2 | 7/2009 | Perret et al. | |
| 7,997,546 B1 * | 8/2011 | Andersen | F16B 2/06 |
| | | | 248/230.8 |
| 8,178,812 B2 | 5/2012 | Martin et al. | |
| 8,269,130 B2 | 9/2012 | Mangan et al. | |
| 8,272,127 B2 | 9/2012 | Kowalyshen et al. | |
| 8,378,242 B2 | 2/2013 | Kim | |
| 8,674,254 B2 | 3/2014 | Borgstrom | |
| 8,729,416 B2 | 5/2014 | Bullock et al. | |
| 8,772,666 B2 | 7/2014 | Darko et al. | |
| 8,785,802 B2 | 7/2014 | Shang | |
| 8,796,570 B2 | 8/2014 | Kobayashi et al. | |
| 8,933,358 B2 | 1/2015 | Yang | |
| 9,070,517 B2 | 6/2015 | Bullock et al. | |
| 9,177,742 B2 | 11/2015 | Ache et al. | |
| 9,190,231 B2 | 11/2015 | Borgstrom et al. | |
| 9,200,654 B1 * | 12/2015 | Parduhn | F16B 2/08 |
| 9,208,962 B2 | 12/2015 | Bose et al. | |
| 9,275,807 B2 | 3/2016 | Darko et al. | |
| 9,316,349 B1 * | 4/2016 | Parduhn | F21V 27/00 |
| 9,543,081 B2 | 1/2017 | Ozil et al. | |
| 9,633,802 B2 | 4/2017 | Chapelle et al. | |
| 9,633,807 B2 | 4/2017 | Ache et al. | |
| 9,640,350 B2 | 5/2017 | Stoving et al. | |
| 9,659,728 B2 | 5/2017 | Martin et al. | |
| 9,685,280 B2 | 6/2017 | Benson et al. | |
| 9,685,283 B2 | 6/2017 | Darko et al. | |
| 9,953,772 B2 | 4/2018 | Korves et al. | |
| 10,074,496 B2 | 9/2018 | Lamara et al. | |
| 10,115,547 B2 | 10/2018 | Gerovac et al. | |
| 10,738,982 B1 * | 8/2020 | Orellana | F16M 13/02 |
| 2001/0025829 A1 | 10/2001 | Marin-pache et al. | |
| 2004/0061032 A1 * | 4/2004 | Bradford | F21V 21/116 |
| | | | 248/224.51 |
| 2005/0082260 A1 | 4/2005 | Martin et al. | |
| 2006/0231529 A1 | 10/2006 | Daharsh et al. | |
| 2008/0087647 A1 | 5/2008 | Volkmar | |
| 2010/0000972 A1 | 1/2010 | Bodenstein et al. | |
| 2010/0089874 A1 | 4/2010 | Morita et al. | |
| 2010/0192373 A1 * | 8/2010 | Sauschuck, Jr. | H02G 1/04 |
| | | | 29/760 |
| 2012/0261384 A1 | 10/2012 | Labianco et al. | |
| 2013/0187732 A1 * | 7/2013 | Bullock | H01H 33/6662 |
| | | | 335/6 |
| 2014/0138357 A1 | 5/2014 | Kasza et al. | |
| 2014/0247542 A1 * | 9/2014 | Fong | H05K 7/00 |
| | | | 361/679.01 |
| 2015/0221464 A1 | 8/2015 | Gentsch et al. | |
| 2015/0262768 A1 | 9/2015 | Siebens et al. | |
| 2015/0311009 A1 | 10/2015 | Ding et al. | |
| 2015/0332883 A1 | 11/2015 | Benke | |
| 2016/0005560 A1 | 1/2016 | Ache et al. | |
| 2016/0012994 A1 | 1/2016 | Boffelli et al. | |
| 2016/0126037 A1 | 5/2016 | Gerovac et al. | |
| 2016/0141117 A1 | 5/2016 | Ashteka et al. | |
| 2017/0207039 A1 | 7/2017 | Pohle | |
| 2018/0090916 A1 * | 3/2018 | Jett | F16M 13/02 |
| 2020/0365352 A1 * | 11/2020 | Sinjonia | H01H 9/38 |

FOREIGN PATENT DOCUMENTS

| | | |
|---|---|---|
| CN | 206135272 U | 4/2017 |
| CN | 109449042 A | 3/2019 |
| EP | 1482528 A2 | 12/2004 |
| EP | 1811536 A1 | 7/2007 |
| EP | 2859567 B1 | 8/2018 |
| GB | 391771 A | 4/1933 |
| JP | 3969344 B2 | 9/2007 |
| WO | WO1990001788 A1 | 2/1990 |
| WO | WO2000041199 A1 | 7/2000 |
| WO | WO2002069352 A1 | 9/2002 |
| WO | WO2009098122 A1 | 8/2009 |
| WO | WO2010058025 A1 | 5/2010 |
| WO | WO2011075931 A1 | 6/2011 |
| WO | 2013187886 A2 | 12/2013 |
| WO | WO2019133611 A1 | 7/2019 |

OTHER PUBLICATIONS

International Search Report and Written Opinion for Application No. PCT/US2020/029841 dated Aug. 14, 2020 (13 pages).
International Preliminary Report on Patentability for Application No. PCT/US2020/029850 dated Nov. 4, 2021 (7 pages).
International Search Report and Written Opinion for Application No. PCT/US2020/029850 dated Aug. 14, 2020 (10 pages).
International Preliminary Report on Patentability for Application No. PCT/US2020/029865 dated Nov. 4, 2021 (7 pages).
International Search Report and Written Opinion for Application No. PCT/US2020/029865 dated Aug. 14, 2020 (11 pages).
International Preliminary Report on Patentability for Application No. PCT/US2020/029868 dated Nov. 4, 2021 (7 pages).
International Search Report and Written Opinion for Application No. PCT/US2020/029868 dated Aug. 14, 2020 (10 pages).
G&W Electric, "Viper-ST," Catalog O-vst14, dated Nov. 2014 (12 pages).
G&W Electric, "Viper-SP," Catalog VSP10, dated Jun. 2010 (8 pages).
European Office Extended European Search Report for application 20796401.6, dated Dec. 12, 2022 (8 pages).

* cited by examiner

INTEGRATED SWITCHGEAR ASSEMBLY

CROSS-REFERENCE TO RELATED APPLICATIONS

This application is a continuation-in-part of co-pending International Patent Application No. PCT/US2020/029868, filed Apr. 24, 2020, which claims priority to U.S. Provisional Application No. 62/916,019, filed Oct. 16, 2019, and to U.S. Provisional Application No. 62/839,278, filed Apr. 26, 2019, the entire contents of all of which are incorporated herein by reference. This application further claims priority to U.S. Provisional Patent Application No. 63/105,705, filed Oct. 26, 2020, the entire content of which is incorporated herein by reference.

FIELD OF THE DISCLOSURE

The present disclosure relates to solid dielectric switchgear, and more particularly to reclosers.

BACKGROUND OF THE DISCLOSURE

Reclosers are switchgear that provide line protection, for example, on overhead electrical power lines and/or substations. Reclosers serve to segment the circuits into smaller sections, reducing the number of potentially impacted customers in the event of a short circuit. Previously, reclosers were controlled using hydraulics. More recently, solid dielectric reclosers have been developed for use at voltages up to 38 kV. Solid dielectric reclosers may be paired with electronic control devices to provide automation and "smart" recloser functionality.

Reclosers and other switchgear are typically sold to an end user as individual units. The end user may then need to procure any required accessories, such as power transformers, lighting arrestors, or the like, often from various suppliers. The end user must then mount the switchgear and any required accessories, ensure the installation meets required line-to-line and line-to-ground clearance requirements, and perform all wiring between the switchgear and the accessories in the field.

SUMMARY OF THE DISCLOSURE

A need exists for fault protection and circuit segmentation in power transmission circuits, which typically operate at higher voltages (e.g., up to 1,100 kV). Reclosers allow for multiple automated attempts to clear temporary faults on overhead lines. In power transmission systems, this function is typically achieved using circuit breakers in substations. The present disclosure provides switchgear in the form of a recloser that can operate at voltages up to 72.5 kV. Due to its higher voltage capabilities, a recloser according to the present disclosure may necessarily be larger, heavier, and require greater line-to-line and line-to-ground clearances than previously available reclosers. The present disclosure thus advantageously provides an integrated assembly to facilitate efficient installation of the recloser.

For example, the present disclosure provides, in one aspect, an integrated assembly including a switchgear apparatus configured for operation at voltages up to 72.5 kV and a mount assembly configured for coupling to a pole and to support the switchgear apparatus from the pole. The mount assembly includes a crossbar, a pole mount configured for coupling to the pole and to be secured to the crossbar at different positions along a length of the crossbar, and a mounting bracket configured to support the switchgear apparatus on the crossbar. The mount assembly further includes a pair of crossbar mounts configured to be secured to the mounting bracket for supporting the mounting bracket on the crossbar at different positions along the length of the crossbar. Each crossbar mount of the pair of crossbar mounts comprises a first arm having a length extending in a plane, a second arm spaced apart from the first arm and having a length extending in the plane and parallel to the first arm, a third arm extending between and coupled to a distal end of each of the first and second arms, and a flange extending between and coupled to a proximal end of each of the first and second arms. The flange is configured for coupling to the mounting bracket, and the flange extends parallel to the third arm. The first, second, and third arms and the flange are positioned to form an enclosed space to receive the crossbar.

The present disclosure provides, in another aspect, an integrated assembly including a switchgear apparatus configured for operation at voltages up to 72.5 kV and a mount assembly configured for coupling to a pole and configured to support the switchgear apparatus from the pole. The mount assembly includes a crossbar, a mounting bracket configured to support the switchgear apparatus on the crossbar, a pair of crossbar mounts configured to be secured to the mounting bracket for supporting the mounting bracket on the crossbar at different positions along a length of the crossbar, and a pole mount configured for coupling to the pole and to be secured to the crossbar at different positions along the length of the crossbar. The pole mount includes a pair of spaced-apart plates each having a first end and a second end opposite the first end, a pair of spaced-apart rods extending between and coupled to each plate of the pair of spaced-apart plates adjacent the first end of each plate, and a pair of spaced-apart elongate members extending between and coupled to each plate of the pair of spaced-apart plates adjacent the second end of each plate. The pair of spaced-apart plates is spaced apart to provide a space to receive the crossbar therebetween and the pair of spaced-apart elongate members is spaced apart to provide a space to receive the pole therebetween.

The present disclosure provides, in another aspect, an integrated assembly for mounting switchgear apparatus configured for operation at voltages up to 72.5 kV to a pole, the integrated assembly including a mount assembly configured for coupling to a pole and configured to support the switchgear apparatus from the pole. The mount assembly includes a crossbar, a first mounting bracket configured to support a first switchgear apparatus on the crossbar, a second mounting bracket configured to support a second switchgear apparatus on the crossbar, and a third mounting bracket configured to support a third switchgear apparatus on the crossbar. The mount assembly further includes a first pair of crossbar mounts configured to be secured to the first mounting bracket for supporting the first mounting bracket on the crossbar at different positions along a length of the crossbar, a second pair of crossbar mounts configured to be secured to the second mounting bracket for supporting the second mounting bracket on the crossbar at different positions along the length of the crossbar, and a third pair of crossbar mounts configured to be secured to the third mounting bracket for supporting the third mounting bracket on the crossbar at different positions along the length of the crossbar. Each crossbar mount of the first, second, and third pairs of crossbar mounts comprises a first arm having a length extending in a plane, a second arm spaced apart from the first arm and having a length extending in the plane and parallel to the first arm, a third arm extending between and coupled to a distal end of each of the first and second arms, and a flange extending between and coupled to a proximal end of each of the first and second arms. The flange is configured for coupling to any one of the first, second, and third mounting brackets. The third arm extends parallel to the flange. The first, second, third arms and the flange are positioned to form an enclosed space to receive the crossbar, and a support channel is positioned between the flange and the crossbar. The mount assembly further includes a first pole mount configured for coupling to a first pole and to be secured to the crossbar at different positions along the length of the crossbar and a second pole mount configured for coupling to a second pole and to be secured to the crossbar at different positions along the length of the crossbar. Each pole mount of the first and second pole mounts comprises a pair of spaced-apart plates. Each plate having a first end and a second end opposite the first end. Each pole mount further includes a pair of spaced-apart rods extending between and coupled to each plate of the pair of spaced-apart plates adjacent the first end of each plate, and a pair of spaced-apart elongate members extending between and coupled to each plate of the pair of spaced-apart plates adjacent the second end of each plate. Each pair of spaced-apart plates is spaced-apart to provide a space to receive the crossbar therebetween and each pair of spaced-apart elongate members is spaced apart to provide a space to receive one of the first and second poles therebetween. In an assembled state of the integrated assembly the first plate of each pair of spaced-apart plates abuts a first surface of the crossbar and the second plate of each pair of spaced-apart plates abuts a second surface of the crossbar opposite the first surface. Each elongate member of each pair of spaced-apart elongate members abuts a fourth surface of the crossbar opposite the third surface.

The present disclosure provides, in another aspect, a method of installing an integrated switchgear assembly on a pole. The method includes securing a first portion of a pole mount to a pole and moving a crossbar relative to the pole. An interrupter is mounted to the crossbar. The method further includes positioning the crossbar on the first portion of the pole mount, adjusting the position of the crossbar relative to the pole, and securing a second portion of the pole mount to the first portion of the pole mount. The crossbar is received between the first portion and the second portion when installed on the pole.

The present disclosure provides, in another aspect, an integrated assembly including a switchgear apparatus configured for operation at voltages up to 72.5 kV and a mount assembly configured for coupling to a pole and to support the switchgear apparatus from the pole. The mount assembly including a mounting bracket configured to support the switchgear apparatus, wherein the mounting bracket includes a flange that can be secured to either one of (a) a crossbar mount configured to support the mounting bracket on a crossbar at different positions along the length of the crossbar and (b) a bracket configured to support the mounting bracket on the pole.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. In addition, as used herein and in the appended claims, the terms "upper", "lower", "top", "bottom", "front", "back", and other directional terms are not intended to require any particular orientation, but are instead used for purposes of description only.

Figure 1:
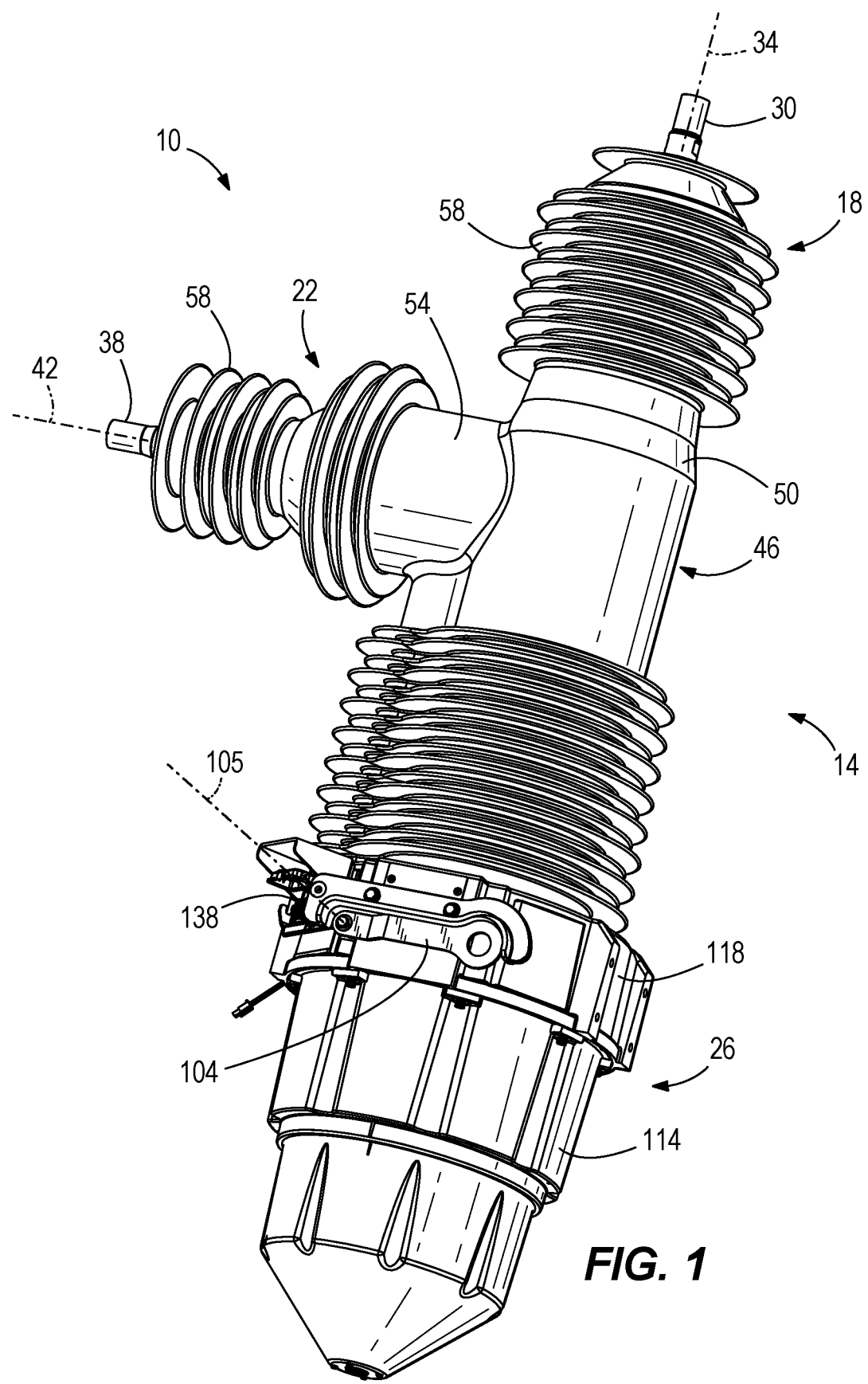
FIG. 1 is a perspective view of a recloser and/or switchgear apparatus ("recloser") according to an embodiment of the present disclosure.

FIG. 1 illustrates a recloser 10 according to an embodiment of the present disclosure. The recloser 10 includes a housing assembly 14, a vacuum interrupter ("VI") assembly 18, a conductor assembly 22, which in some embodiments may be a load-side conductor assembly 22 and in other embodiments may be a source-side conductor assembly 22, and an actuator assembly 26. The VI assembly 18 includes a first terminal 30 extending from the housing assembly 14 along a first longitudinal axis 34, and the conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. The actuator assembly 26 may operate the VI assembly 18 to selectively break and/or reestablish a conductive pathway between the first and second terminals 30, 38. Although the recloser 10 is illustrated individually in FIG. 1, the recloser 10 may be part of a recloser system including a plurality of reclosers 10, each associated with a different phase of a three-phase power transmission system and ganged together such that operation of the plurality of reclosers 10 is synchronized.

Figure 2:
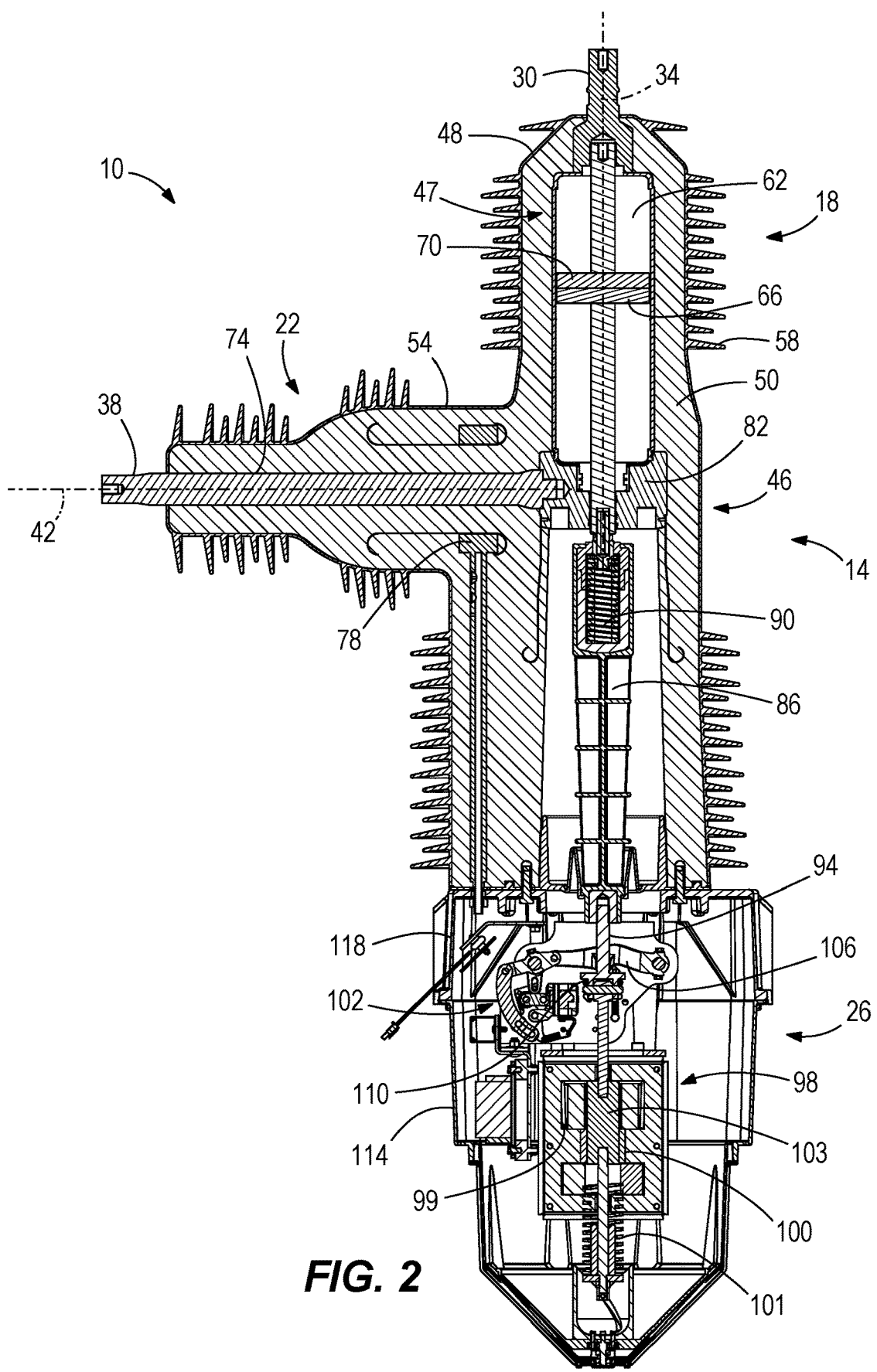
FIG. 2 is a cross-sectional view of the recloser of FIG. 1.
Figure 3:
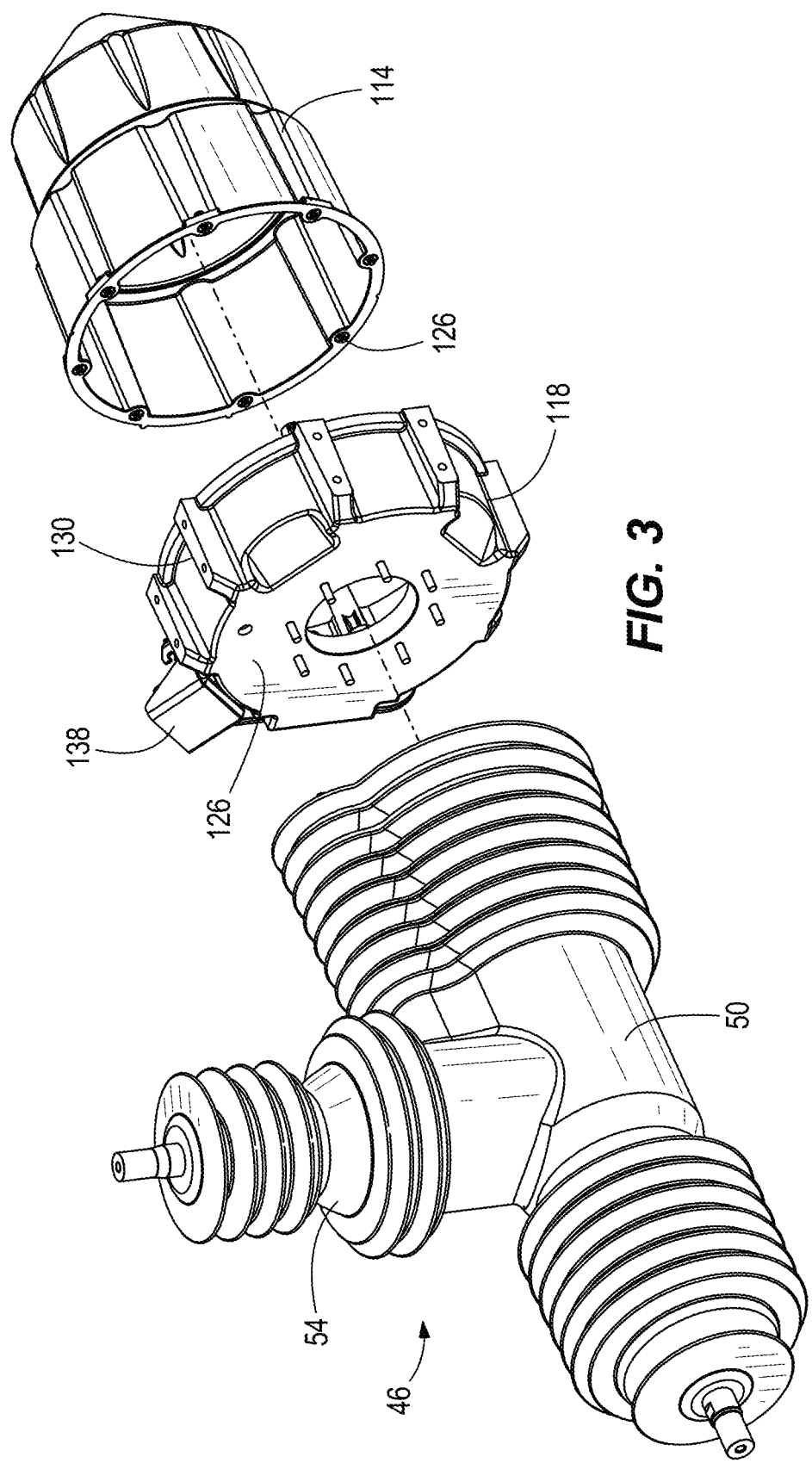
FIG. 3 is an exploded perspective view of a housing of the recloser of FIG. 1.

Referring now to FIG. 2, the illustrated housing assembly 14 includes a main housing 46 with an insulating material, such as epoxy, that forms a solid dielectric module 47. The solid dielectric module 47 is preferably made of a silicone or cycloaliphatic epoxy. In other embodiments, the solid dielectric module 47 may be made of a fiberglass molding compound. In other embodiments, the solid dielectric module 47 may be made of other moldable dielectric materials. The main housing 46 may further include a protective layer 48 surrounding the solid dielectric module 47. In some embodiments, the protective layer 48 withstands heavily polluted environments and serves as an additional dielectric material for the recloser 10. In some embodiments, the protective layer 48 is made of silicone rubber that is overmolded onto the solid dielectric module 47. In other embodiments, the protective layer 48 may be made of other moldable (and preferably resilient) dielectric materials, such as polyurethane.

With continued reference to FIG. 2, the main housing 46 includes a first bushing 50 that surrounds and at least partially encapsulates the VI assembly 18, and a second bushing 54 that surrounds and at least partially encapsulates the conductor assembly 22. The silicone rubber layer 48 includes a plurality of sheds 58 extending radially outward from both bushings 50, 54. In other embodiments, the sheds 58 may be formed as part of the dielectric module 47 and covered by the silicone rubber layer 48. In yet other embodiments, the sheds 58 may be omitted. The first and second bushings 50, 54 may be integrally formed together with the dielectric module 47 of the main housing 46 as a single monolithic structure. Alternatively, the first and second bushings 50, 54 may be formed separately and coupled to the main housing 46 in a variety of ways (e.g., via a threaded connection, snap-fit, etc.).

The illustrated VI assembly 18 includes a vacuum bottle 62 at least partially molded within the first bushing 50 of the main housing 46. The vacuum bottle 62 encloses a movable contact 66 and a stationary contact 70 such that the movable contact 66 and the stationary contact 70 are hermetically sealed within the vacuum bottle 62. In some embodiments, the vacuum bottle 62 has an internal absolute pressure of about 1 millipascal or less. The movable contact 66 is movable along the first longitudinal axis 34 between a closed position (illustrated in FIG. 2) and an open position (not shown) to selectively establish or break contact with the stationary contact 70. Due to the lack of conductive atmosphere within the bottle 62, the vacuum bottle 62 quickly suppresses electrical arcing that may occur when the contacts 66, 70 are opened.

The conductor assembly 22 may include a conductor 74 and a sensor assembly 78, each at least partially molded within the second bushing 54 of the main housing 46. The sensor assembly 78 may include a current sensor, voltage sensor, partial discharge sensor, voltage indicated sensor, and/or other sensing devices. One end of the conductor 74 is electrically coupled to the movable contact 66 via a current interchange 82. The opposite end of the conductor 74 is electrically coupled to the second terminal 38. The first terminal 30 is electrically coupled to the stationary contact 70. The first terminal 30 and the second terminal 38 are configured for connection to respective electrical power transmission lines.

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The encapsulated spring 90 biases the movable contact 66 toward the stationary contact 70. The opposite end of the drive shaft 86 is coupled to an output shaft 94 of an electromagnetic actuator 98. The electromagnetic actuator 98 is operable to move the drive shaft 86 along the first longitudinal axis 34 and thereby move the movable contact 66 relative to the stationary contact 70. In additional or alternative embodiments, the functionality provided by the encapsulated spring 90 may be provided with an external spring and/or a spring positioned otherwise along the drive shaft 86. For example, the spring may be instead positioned at a first end or at a second end of the drive shaft 86.

The electromagnetic actuator 98 in the illustrated embodiment includes a coil 99, a permanent magnet 100, a spring 101, and a plunger 103 that is coupled to the output shaft 94. The coil 99 includes one or more copper windings which, when energized, produce a magnetic field that acts on the plunger 103 to move the output shaft 94. The permanent magnet 100 is configured to hold the plunger 103 and the output shaft 94 in a position corresponding with the closed position of the movable contact 66.

The spring 101 biases the output shaft 94 in an opening direction (i.e. downward in the orientation of FIG. 2) to facilitate opening the contacts 66, 70, as described in greater detail below. The force exerted by the spring 101 when the contacts 66, 70 are in the closed position is less than the magnetic holding force. Thus, the permanent magnet 100 provides a strong magnetic holding force to maintain the contacts 66, 70 in their closed position against the biasing force of the spring 101, without requiring any current to be supplied through the coil 99.

In some embodiments, the actuator assembly 26 may include other actuator configurations. For example, in some embodiments, the permanent magnet 100 may be omitted, and the output shaft 94 may be latched in the closed position in other ways. In additional or alternative embodiments, the electromagnetic actuator 98 may be omitted or replaced by any other suitable actuator (e.g., a hydraulic actuator, etc.).

The actuator assembly 26 includes a controller (not shown) that controls operation of the electromagnetic actuator 98. In some embodiments, the controller receives feedback from the sensor assembly 78 and energizes and/or de-energizes the electromagnetic actuator 98 automatically in response to one or more sensed conditions. For example, the controller may receive feedback from the sensor assembly 78 indicating that a fault has occurred. In response, the controller may control the electromagnetic actuator 98 to automatically open the VI assembly 18 and break the circuit. The controller may also control the electromagnetic actuator 98 to automatically close the VI assembly 18 once the fault has been cleared (e.g., as indicated by the sensor assembly 78).

Figure 5:
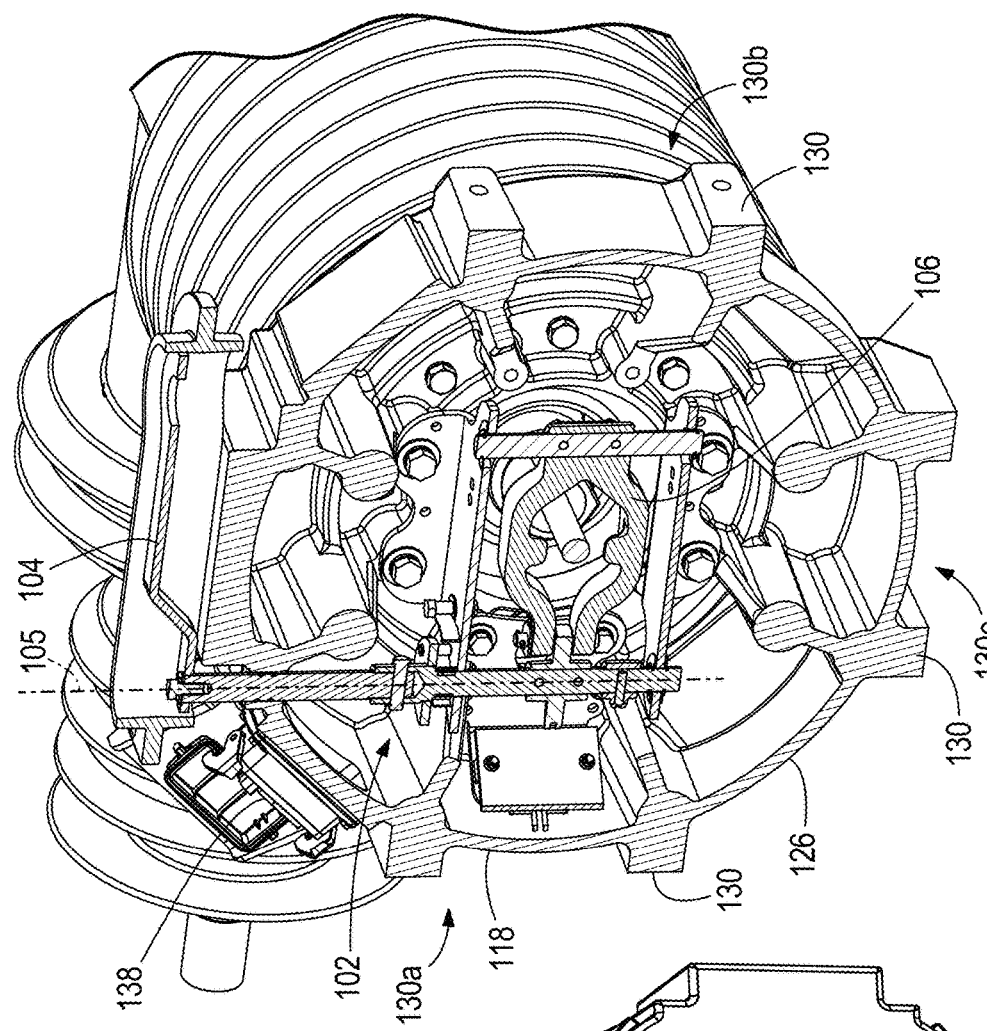
FIG. 5 is a cross-sectional view of the recloser of FIG. 1, taken through the head casting of FIG. 4.
Figure 4:
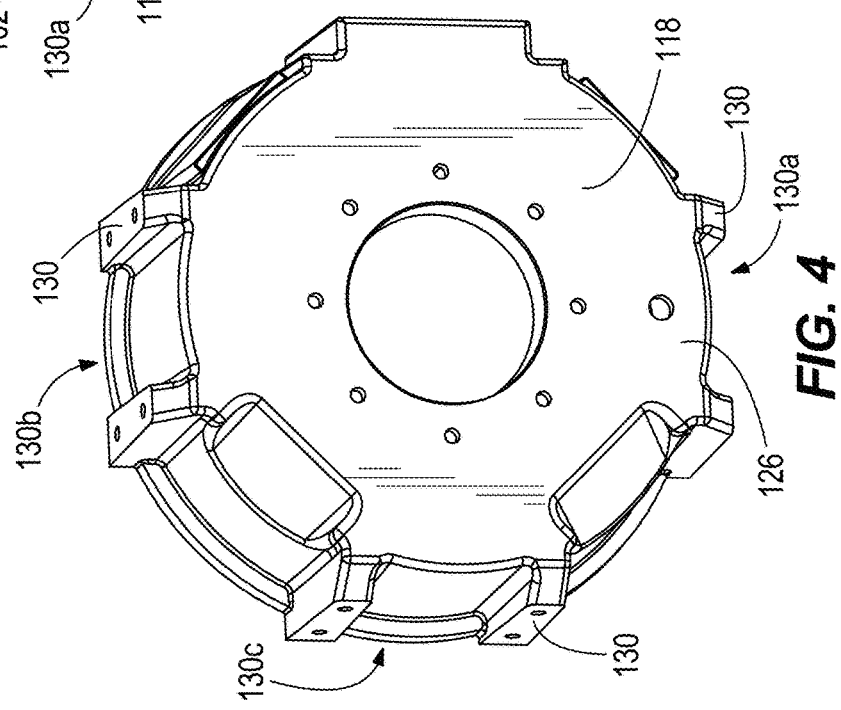
FIG. 4 is a perspective view of a head casting of the recloser of FIG. 1.

Referring to FIGS. 4 and 5, the head casting 118 includes a main body 126 and a plurality of mounting bosses 130 spaced along the outer periphery of the main body 126. In the illustrated embodiment, the plurality of mounting bosses 130 includes a first pair of bosses 130a extending from the main body 126 in a first direction, a second pair of bosses 130b extending from the main body 126 in a second direction opposite the first direction, and a third pair of bosses 130c extending from the main body 126 in a third direction orthogonal to the first and second directions. In other embodiments, the head casting 118 may include a different number and/or arrangement of mounting bosses 130.

The head casting 118 is couplable to the main housing 46 in a plurality of different orientations such that the pairs of bosses 130 (130a, 130b, 130c) may be positioned in a number of different rotational orientations about axis 34 with respect to the main housing 46. That is, the rotational orientation of the pairs of bosses 130 about the circumference of the main housing 46 may be varied as desired by rotating the orientation of the head casting 118 and main housing 46 relative to one another about the axis 34 to a desired position before coupling the head casting 118 and the main housing 46. In some embodiments, the head casting 118 may be coupled to the main housing 46 in at least three different orientations. In other embodiments, the head casting 118 may be coupled to the main housing 46 in at least six different orientations. In other embodiments, the main housing 46, the head casting 118, and the actuator housing 114 may be coupled together in other ways (e.g., via direct threaded connections or the like).

With reference to FIG. 5, the illustrated actuator assembly 26 includes a manual trip assembly 102 supported by the head casting 118 and that can be used to manually open the VI assembly 18. The manual trip assembly 102 includes a handle 104 accessible from an exterior of the housing assembly 14. In the illustrated embodiment, the handle 104 of the manual trip assembly 102 extends along a side of the main body 126 opposite the third pair of bosses 130c and generally adjacent the connector 138. The handle 104 is preferably at a grounded potential. Because the head casting 118 is couplable to the main housing 46 in different orientations, the position of the handle 104 with respect to the main housing 46 is also variable. As such, the handle 104 may be accessible to an operator when the recloser 10 is in a wide variety of different mounting configurations. In the illustrated embodiment, the handle 104 is rotatable about a first rotational axis 105 to move a yoke 106 inside the head casting 118. The yoke 106 is engageable with a collar 110 on the output shaft 94 to move the movable contact 66 (FIG. 2) toward the open position.

Exemplary operating sequences of the recloser 10 according to certain embodiments of the present disclosure will now be described with reference to FIG. 2. During operation, the controller of the recloser 10 may receive feedback from the sensor assembly 78 indicating that a fault has occurred. In response to this feedback, the controller may initiate a circuit breaking sequence. In the circuit breaking sequence, the controller automatically energizes the coil 99 of the electromagnetic actuator 98. The resultant magnetic field generated by the coil 99 moves the plunger 103 and the output shaft 94 in an opening direction (i.e. downward in the orientation of FIG. 2). This movement greatly reduces the magnetic holding force of the permanent magnet 100 on the plunger 103. For example, in some embodiments, the plunger 103 may have a resilient construction and retract inwardly and away from the permanent magnet 100 as the plunger 103 moves in the opening direction, thereby creating an air gap between the plunger 103 and the magnet 100. In other embodiments, the width of the plunger 103 may decrease in the opening direction to create an air gap between the plunger 103 and the magnet 100. In yet other embodiments, the plunger 103 may include one or more non-magnetic regions and/or a reduced volume of magnetic material that may move into proximity with the permanent magnet 100 as the plunger 103 moves in the opening direction.

With the holding force of the permanent magnet 100 reduced, the spring 101 is able to overcome the holding force of the permanent magnet 100 and accelerate the output shaft 94 in the opening direction. As such, the coil 99 need only be energized momentarily to initiate movement of the output shaft 94, advantageously reducing the power drawn by the electromagnetic actuator 98 and minimizing heating of the coil 99.

The output shaft 94 moves the drive shaft 86 with it in the opening direction. As the drive shaft 86 moves in the opening direction, the encapsulated spring 90, which is compressed when the contacts 66, 70 are closed, begins to expand. The spring 90 thus initially permits the drive shaft 86 to move in the opening direction relative to the movable contact 66 and maintains the movable contact 66 in fixed electrical contact with the stationary contact 70. As the drive shaft 86 continues to move and accelerate in the opening direction under the influence of the spring 101, the spring 90 reaches a fully expanded state. When the spring 90 reaches its fully expanded state, the downward movement of the drive shaft 86 is abruptly transferred to the movable contact 66. This quickly separates the movable contact 66 from the stationary contact 70 and reduces arcing that may occur upon separating the contacts 66, 70. By quickly separating the contacts 66, 70, degradation of contacts 66, 70 due to arcing is reduced, and the reliability of the VI assembly 18 is improved.

The controller may then receive feedback from the sensor assembly 78 indicating that the fault has been cleared and initiate a reclosing sequence. In additional and/or alternative embodiments, the controller may initiate the reclosing sequence after waiting a predetermined time period after the fault was originally detected, or in response to receiving a signal from an external controller commanding the controller to initiate the reclosing sequence. In the reclosing sequence, the controller energizes the coil 99 in an opposite current direction. The resultant magnetic field generated by the coil 99 moves the output shaft 94 (and with it, the drive shaft 86 and the movable contact 66) in a closing direction (i.e. upward in the orientation of FIG. 2).

The movable contact 66 comes into contact with the fixed contact 70, restoring a conductive path between the terminals 30, 38. The output shaft 94 and drive shaft 86 continue to move in the closing direction, compressing each of the springs 90, 101 to preload the springs 90, 101 for a subsequent circuit breaking sequence. As the output shaft 94 approaches the end of its travel, the plunger 103 of electromagnetic actuator 98 is influenced by the permanent magnet 100, which latches the plunger 103 in its starting position. The coil 99 may then be de-energized. In some embodiments, the coil 99 may be de-energized a predetermined time period after the contacts 66, 70 are closed. This delay may inhibit the movable contact 66 from rebounding back to the open position.

In some circumstances, an operator may opt to manually initiate a circuit breaking operation to open the contacts 66, 70 using the manual trip assembly 102. In some embodiments, the manual trip assembly 102 may include a mechanical and/or an electrical interlock to lock the movable contact 66 in its open position when the manual trip assembly 102 is actuated, thereby preventing the electromagnetic actuator 98 from reclosing the contacts 66, 70.

Figure 6:
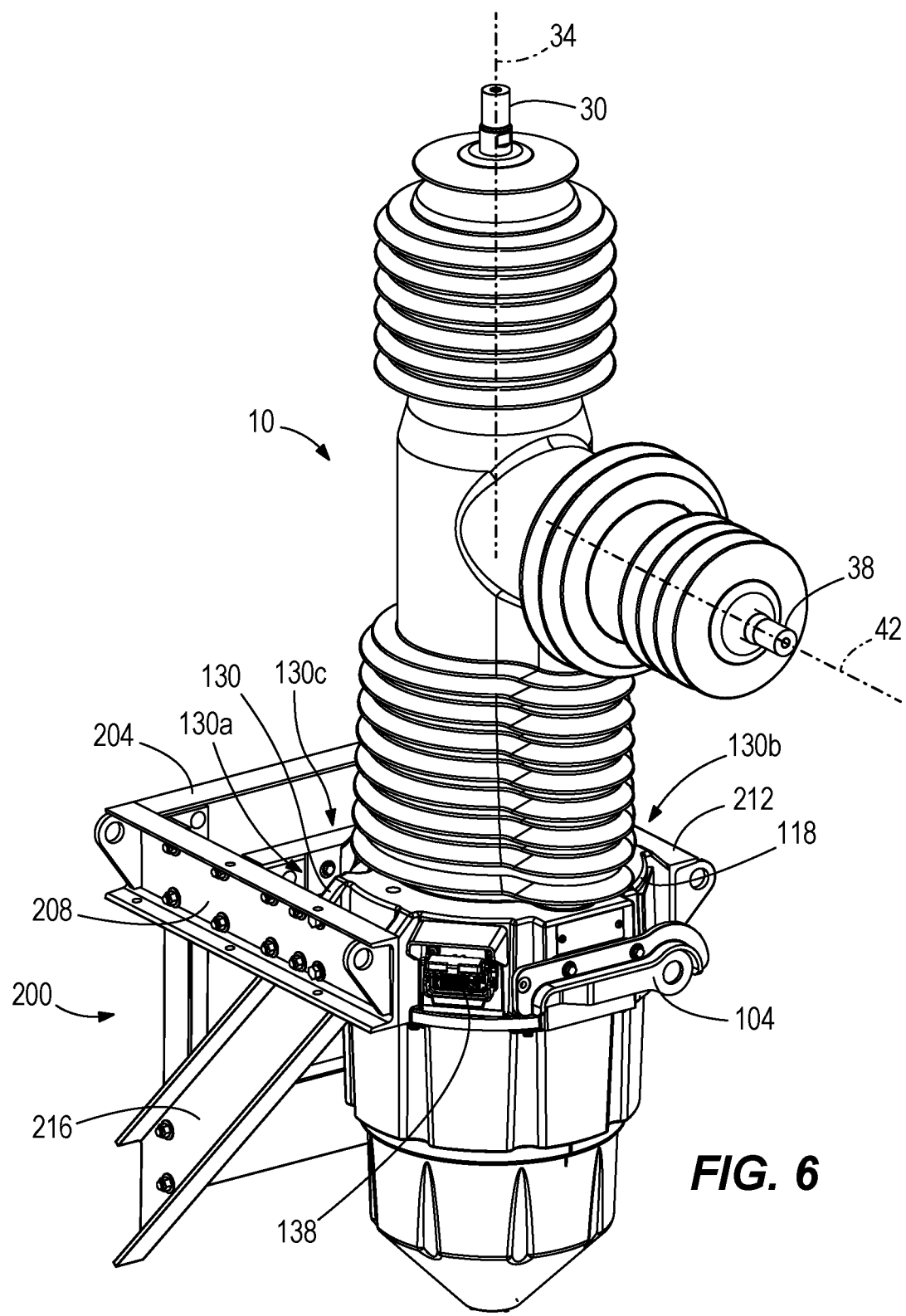
FIG. 6 is a perspective view of an assembly including the recloser of FIG. 1 coupled to a bracket in a vertical orientation.

Referring to FIG. 6, the illustrated recloser 10 may be coupled to a mounting bracket 200 that interfaces with the bosses 130 on the head casting 118 to facilitate mounting the recloser 10 in a variety of different orientations. The illustrated mounting bracket 200 includes a backing frame 204, a first arm 208 extending perpendicularly from the backing frame 204, a second arm 212 extending perpendicularly from the backing frame 204 and spaced from the first arm 208, a first brace 216 extending at an angle between the backing frame 204 and the first arm 208, and a second brace (not shown) structured and oriented in the same manner as the first brace 216 extending at an angle between the backing frame 204 and the second arm 212. As such, the illustrated mounting bracket 200 is generally U-shaped.

The recloser 10 is received within a space defined between the arms 208, 212 such that the handle 104 and connector 138 face away from the backing frame 204. As such, the handle 104 and connector 138 are easily accessible when the recloser 10 is attached to the mounting bracket 200. The first arm 208 is coupled to the first pair of bosses 130a, and the second arm 212 is coupled to the second pair of bosses 130b (e.g., with a plurality of threaded fasteners; not shown). The backing frame 204 is coupled to the third pair of bosses 130c. Thus, the mounting bracket 200 is attached to the head casting 118 of the recloser 10 on three different sides to securely hold the recloser 10.

Figure 7:
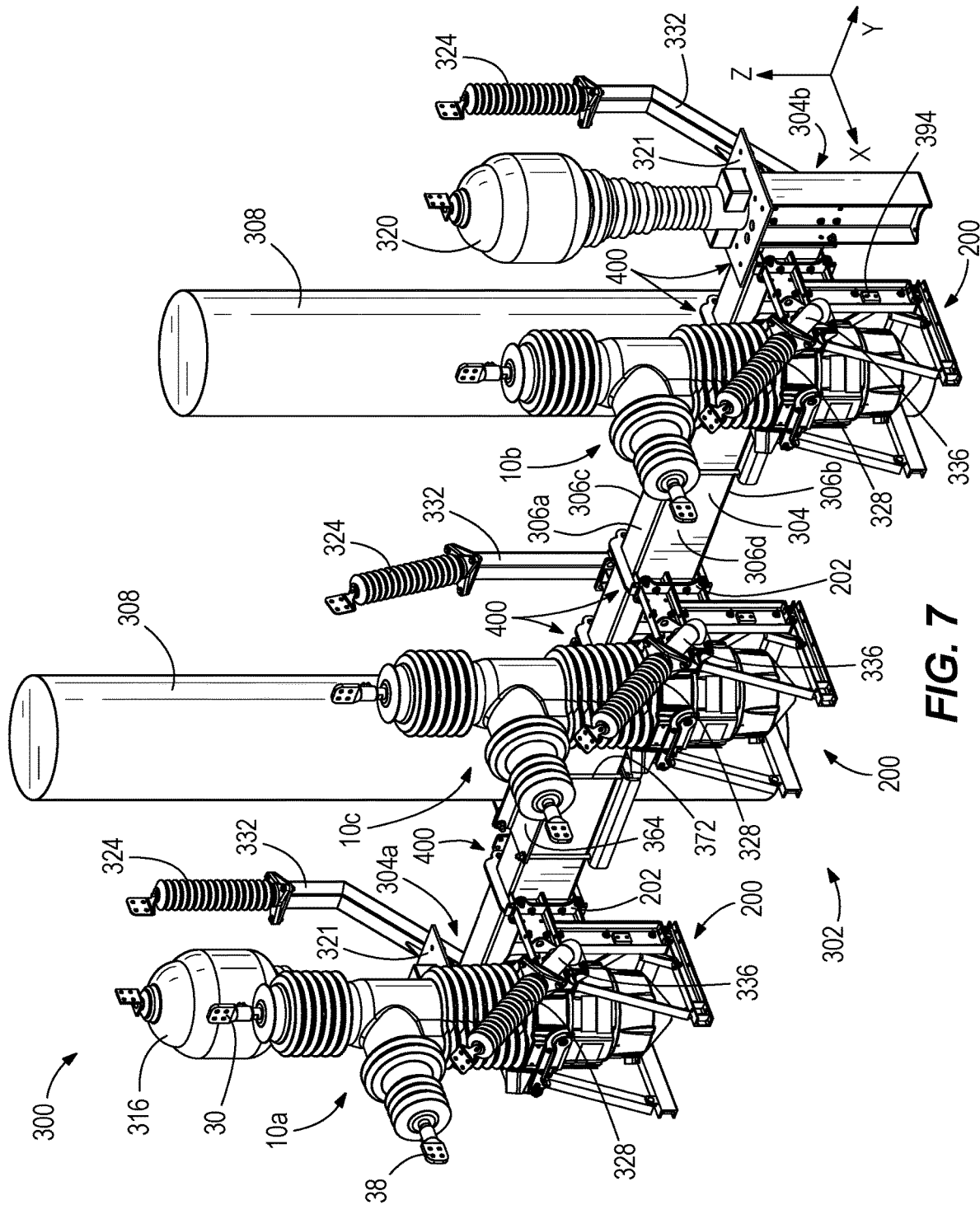
FIG. 7 is a front perspective view of an integrated assembly according to an embodiment of the present disclosure.
Figure 8:
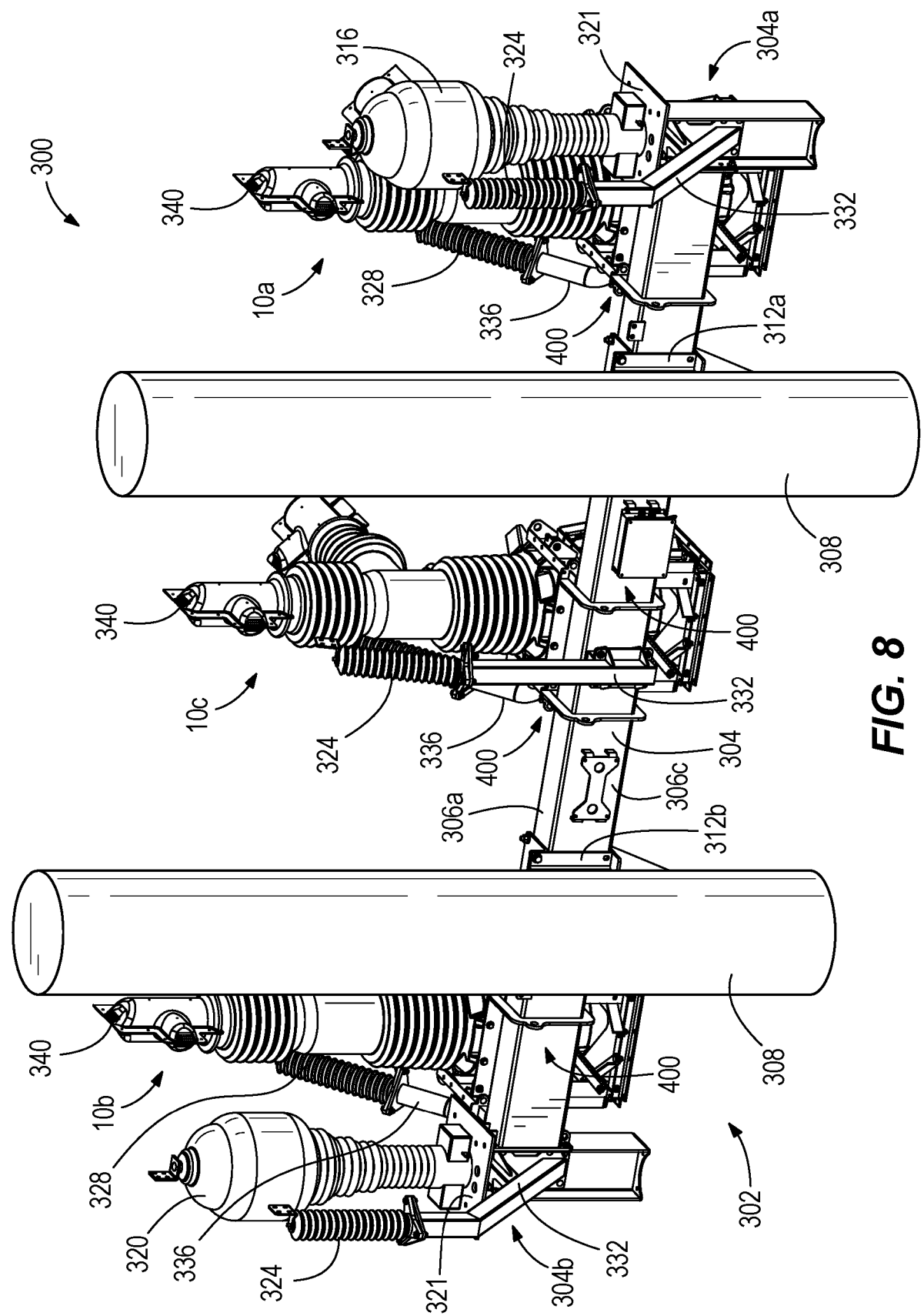
FIG. 8 is a rear perspective view of the integrated assembly of FIG. 7.
Figure 9:
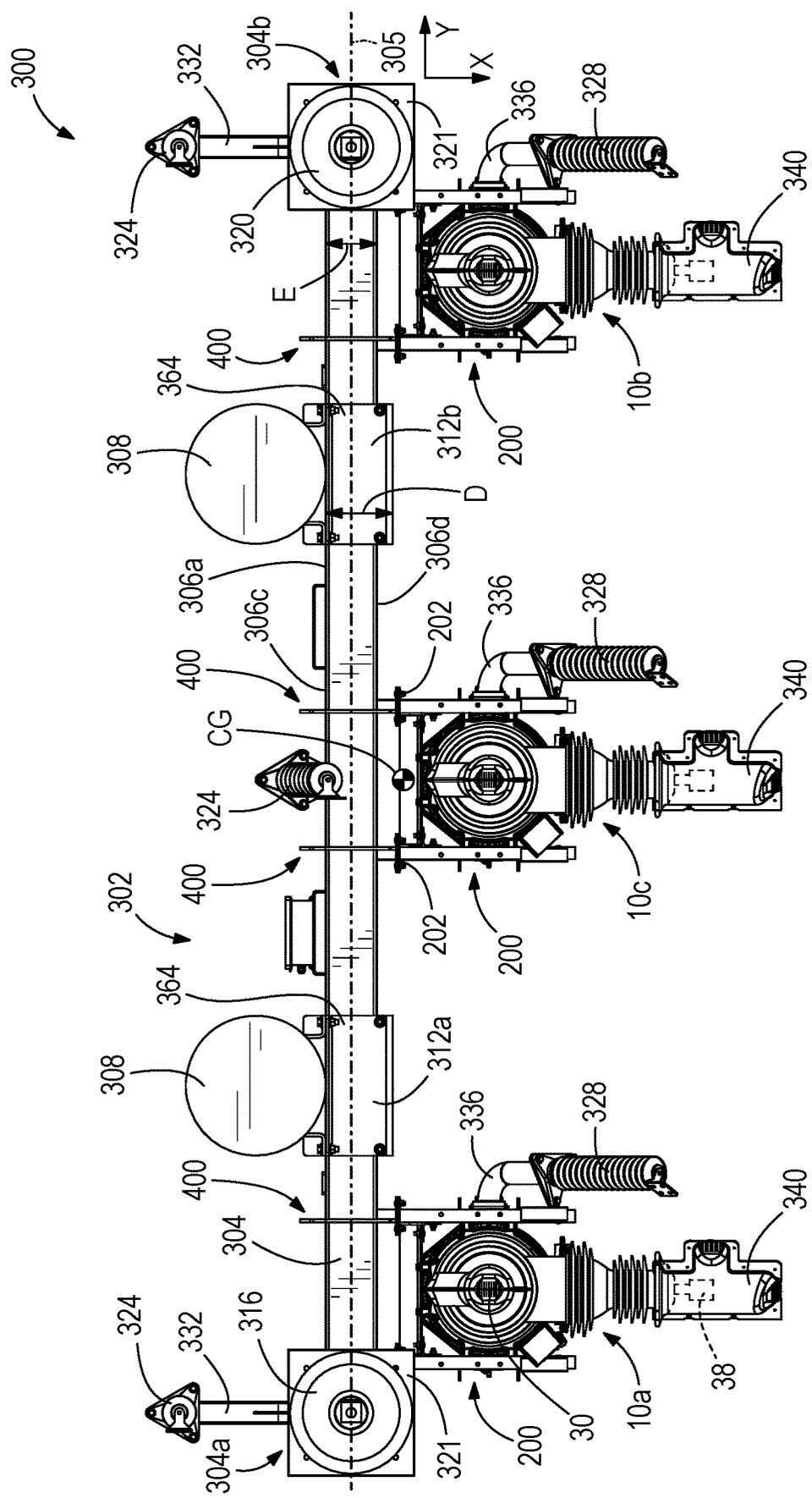
FIG. 9 is a top view of the integrated assembly of FIG. 7.

Referring to FIGS. 7-9, the recloser 10 may be part of a recloser system or integrated switchgear assembly 300 including first, second, and third reclosers 10a, 10b, 10c—each associated with a different phase of a three-phase power transmission system. The reclosers 10a-c may be electronically and/or mechanically ganged together to synchronize operation between each other (including, for example, opening and closing the contacts 66, 70 of the reclosers 10a-c). The integrated assembly 300 includes a mount assembly 302 configured for coupling to a plurality of poles (e.g., two poles 308) and to support the reclosers 10a-c from the poles.

In the illustrated embodiment, the mount assembly 302 includes a support element or crossbar 304. The crossbar 304 is elongated along a longitudinal axis 305 that extends centrally through the crossbar 304. (FIG. 9). In some embodiments, an exterior of the crossbar 304 is galvanized. Alternatively, the crossbar 304 may include one or more other corrosion-resistant coatings. As described in greater detail below, the reclosers 10a, 10b, 10c are coupled to the crossbar 304 without requiring any apertures or holes in the crossbar 304. This maintains the integrity of the galvanized or other corrosion-resistant coating and therefore improves the weather-resistance of the crossbar 304. In some embodiments, the crossbar 304 may include drain holes (not shown) disposed in a bottom surface of the crossbar. In other embodiments, the crossbar 304 may be made of stainless steel and may not include drain holes (i.e. the interior of the crossbar 304 may be completely sealed).

The three reclosers 10a-c are supported on the crossbar 304 by respective mounting brackets 200. The first recloser 10a is positioned adjacent a first end 304a of the crossbar 304, and the second recloser 10b is positioned adjacent a second end 304b of the crossbar 304 opposite the first end 304a. The third recloser 10c is centered along the length of the crossbar 304 and between the reclosers 10a-b.

Figure 12:
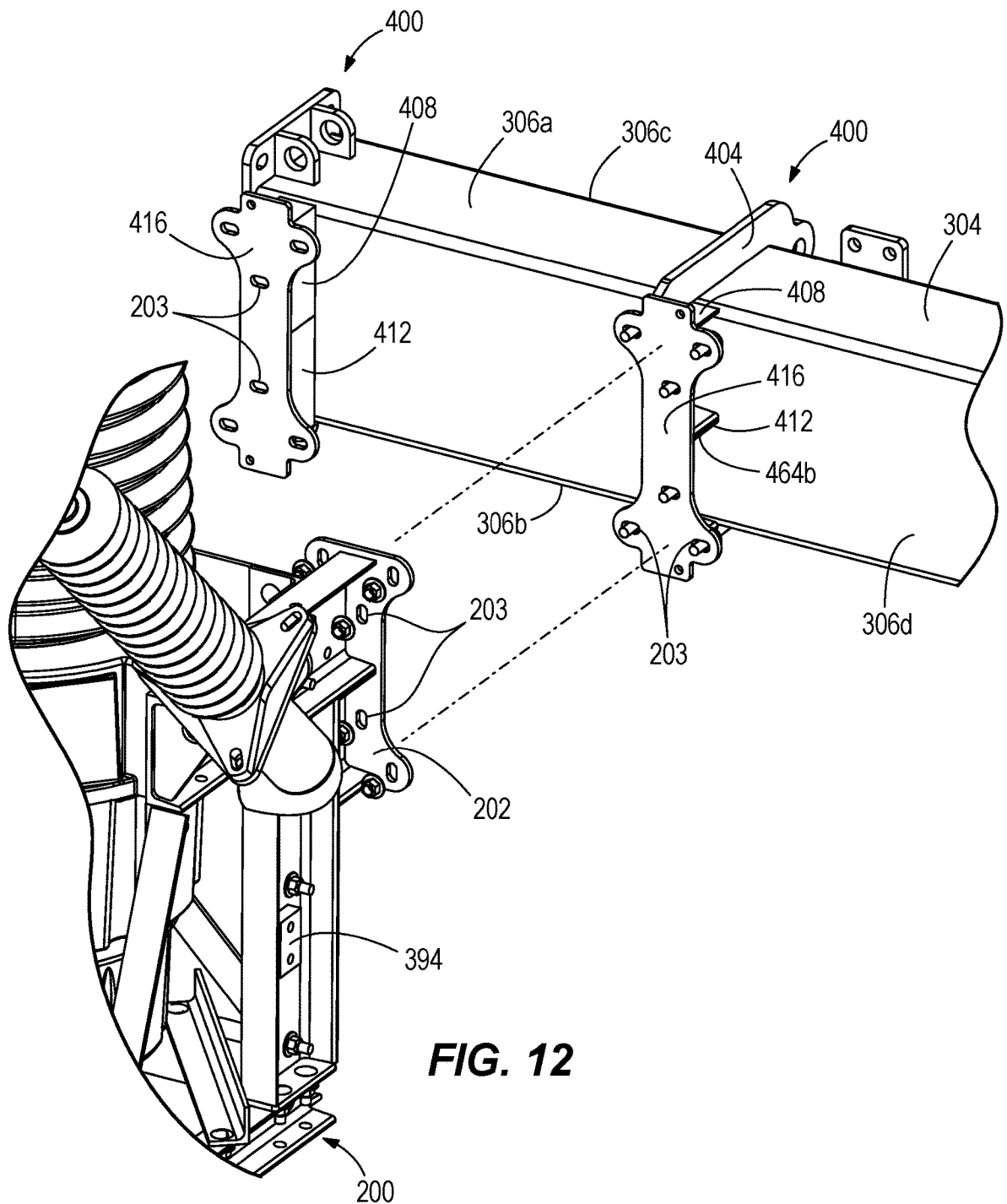
FIG. 12 is a partial perspective view of the integrated assembly of FIG. 7, with a mounting bracket exploded from a crossbar mount.
Figure 13:
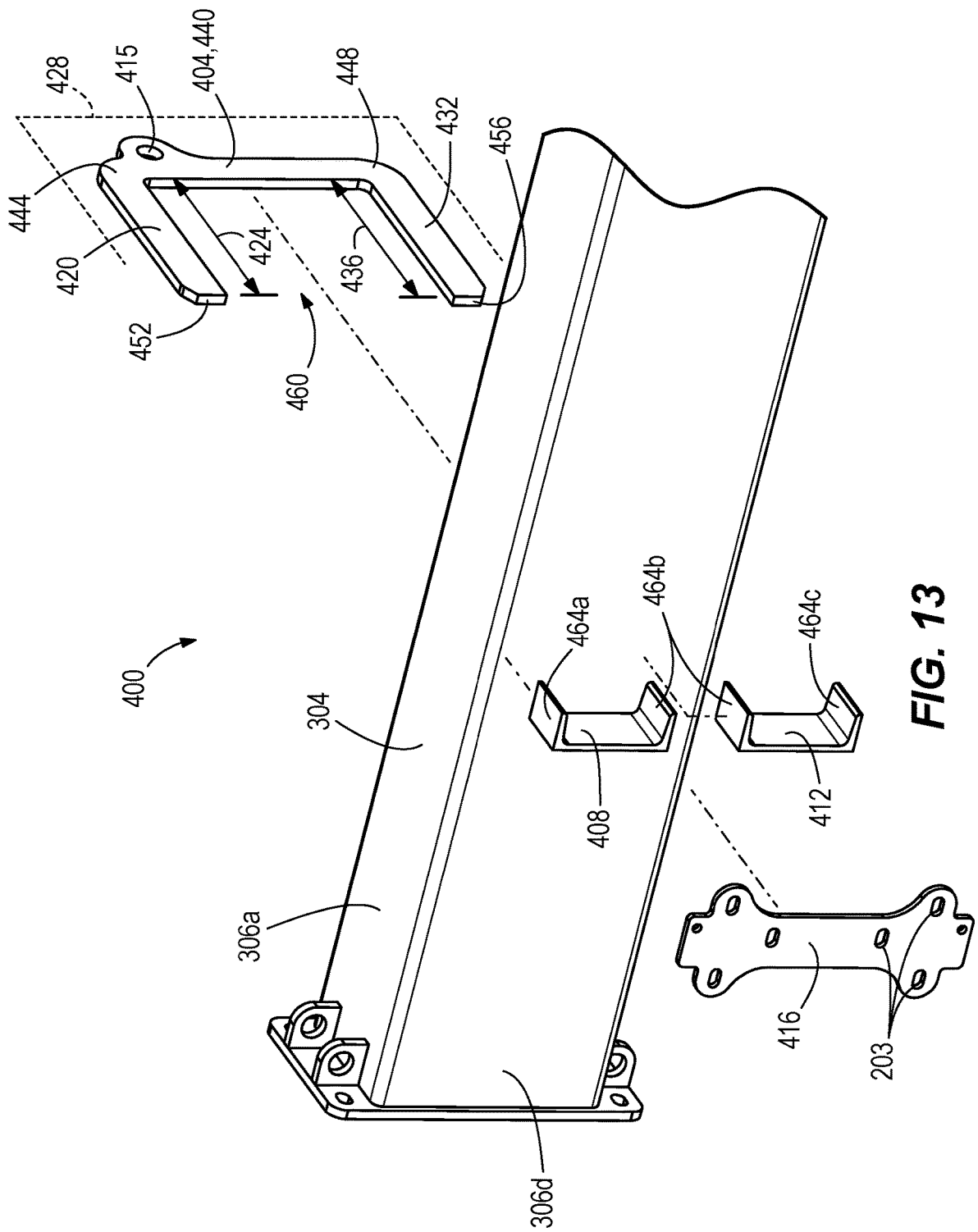
FIG. 13 is an exploded view of the crossbar mount of FIG. 12.

With reference to FIGS. 12-13, the mount assembly 302 of the integrated assembly 300 further includes a plurality of crossbar mounts 400 that couple mounting brackets 200 to the crossbar 304. In some embodiments, each of the reclosers 10a-c and their corresponding mounting brackets 200 are coupled to a pair of crossbar mounts 400 (FIG. 7). The crossbar mounts 400 are configured to be secured to the crossbar 304 at different positions along the length of the crossbar 304 corresponding with the desired positions of the mounting brackets 200 and the reclosers 10a-c along the length of the crossbar 304.

Figure 12A:
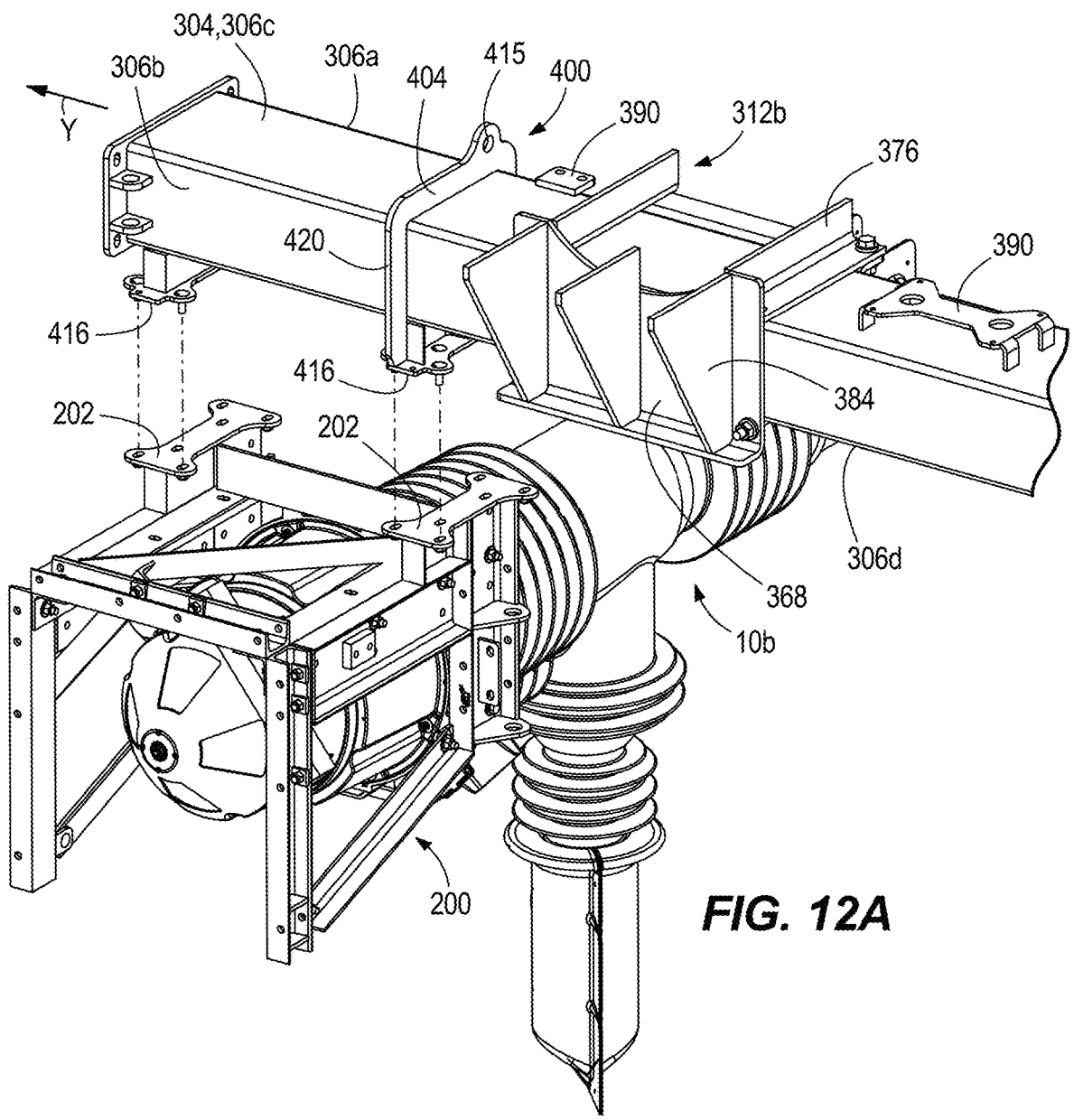
FIG. 12A is another partial perspective view illustrating the mounting bracket of FIG. 12 exploded from the crossbar mount.

The illustrated crossbar mount 400 includes a first plate 404, a first support channel 408, a second support channel 412, and a flange 416. With reference to FIG. 13, the first plate 404 includes a first arm 420 having a length 424 extending in a plane 428, a second arm 432 spaced apart from the first arm 420 and having a length 436 extending in the plane 428 and parallel to the first arm 420, and a third arm 440 extending between and coupled to a distal end 444, 448 of each of the first and second arms 420, 432, respectively. In the illustrated embodiment, the first plate 404 is C-shaped and the arms 420, 432, 440 are co-planar. In other words, the arms 420, 432, 440 all extend in the plane 428 in the illustrated embodiment. The first plate 404 abuts a first surface 306a, a second surface 306b, and a third surface 306c of the crossbar 304. (FIGS. 12-12A). Specifically, the first arm 420 abuts the first surface 306a, the second arm 432 abuts the second surface 306b, and the third arm 440 abuts the third surface 306c. In some embodiments, the first arm 420 is welded to the first surface 306a, the second arm 432 is welded to the second surface 306b, and the third arm 440 is welded to the third surface 306c.

The flange 416 extends between and is coupled to a proximal end 452, 456 of each of the first arm 420 and the second arm 432, respectively. The flange 416 extends parallel to the third arm 440. In the illustrated embodiment, the flange 416 and the third arm 440 both extend vertically, as viewed from the frame of reference of FIG. 12. The first arm 420, the second arm 432, the third arm 440, and the flange 416 are positioned to form an enclosed space 460 in which to receive the crossbar 304. In other words, the flange 416 and the first plate 404 surround the crossbar 304 on all four sides 306a-d. The first and second support channels 408, 412 are coupled together and are positioned between the fourth surface 306d of the crossbar 304 and the flange 416.

The support channels 408, 412 improve the structural strength and capacity of the crossbar mounts 400. In the illustrated embodiment, the support channels 408, 412 are C-channels that that include support ribs 464a-c. In some embodiments, a rib (i.e., the middle rib 464b) is formed by axially abutting the two support channels 408, 412 together. In an assembled state, the ribs 464a-c abuts a proximal surface (i.e., the fourth surface 306d) of the crossbar 304.

In the illustrated embodiment, the first plate 404, the first support channel 408, and the second support channel 412 are welded together to the crossbar 304, and the flange 416 is welded to the support channels 408, 412 opposite the crossbar 304. (FIGS. 12-13). The welded connection between the support channels 408, 412 and the crossbar 304 are strong enough to support the weight of the associated reclosers 10a, 10b, 10c and mounting brackets 200 without requiring any holes to be drilled through the crossbar 304. The first plate 404 of each crossbar mount 400 at least partially surrounds the crossbar 304 and braces the crossbar 304 to inhibit twisting or other deformation of the crossbar 304. The first plate 404 also includes one or more apertures 415 (FIGS. 12A-13), which provide an attachment point to facilitate lifting crossbar 304 into place on the poles 308 during on-site installation. In some embodiments, however, the first plate 404 may be omitted from the crossbar mount 400, such that the crossbar mount 400 includes only the first and second support channel 408, 412 welded to the crossbar 304, and the flange 416 welded to the support channels 408, 412. Furthermore, crossbar mounts 400 with and without the first plate 404 may be incorporated together into the same integrated assembly 300.

With reference to FIGS. 12-12A, the flange 416 is configured for coupling to the mounting bracket 200. More specifically, the flange 416 is configured to be bolted to a corresponding flange 202 on the mounting bracket 200. Each of the flanges 416 and 202 includes a plurality of slotted holes 203 through which fasteners can be received to secure two flanges 416 and 202 together. In the illustrated embodiment, the flanges 416, 202 are bolted together in a direct facing relationship.

Due to their high voltage capabilities, the reclosers 10a-c are larger, heavier, and require greater line-to-line and line-to-ground clearances than previously available reclosers at lower voltage classes. For example, the reclosers 10a-c may each weigh between about 900 pounds and about 1,200 pounds in some embodiments, or between about 1,000 pounds and about 1,100 pounds in other embodiments. Despite the relatively large size and weight of the reclosers 10a-c, the construction of the illustrated integrated assembly 300 and in particular, the crossbar 304, allows the integrated assembly 300 to be mounted on electrical utility poles 308 with the reclosers 10a-c in a laterally-spaced or side-by-side arrangement. As such, the illustrated integrated assembly 300 may advantageously be installed in a wide variety of locations (including outside of electrical substations).

For example, the crossbar 304 may be coupled to first and second parallel utility poles 308 by respective pole mounts 312a, 312b (FIG. 8). In some embodiments, at least a portion of each of the pole mounts 312a, 312b is securely coupled (e.g., welded) to the pole 308. In the illustrated embodiment, the pole mounts 312a, 312b are positioned between the reclosers 10a-b and the recloser 10c along the length of the crossbar 304. In other words, the pole mounts 312 are coupled to the poles 308 and coupled to the crossbar 304 at different positions along a length of the crossbar 304. In some embodiments, the pole mounts 312a, 312b are part of the mount assembly 302.

In the illustrated embodiment, the first pole mount 312a is positioned between the first recloser 10a and the third recloser 10c along the length of the crossbar 304, and the second pole mount 312b is positioned between the second recloser 10b and the third recloser 10c along the length of the crossbar 304. As such, the integrated assembly 300 may have a center of gravity CG that is between the two poles 308. In addition, the illustrated integrated assembly 300 is configured such that the reclosers 10a-c and the utility poles 308 are positioned on opposite sides of the longitudinal axis 305, which may provide improved access to the reclosers 10a-c (FIG. 9).

Figure 11:
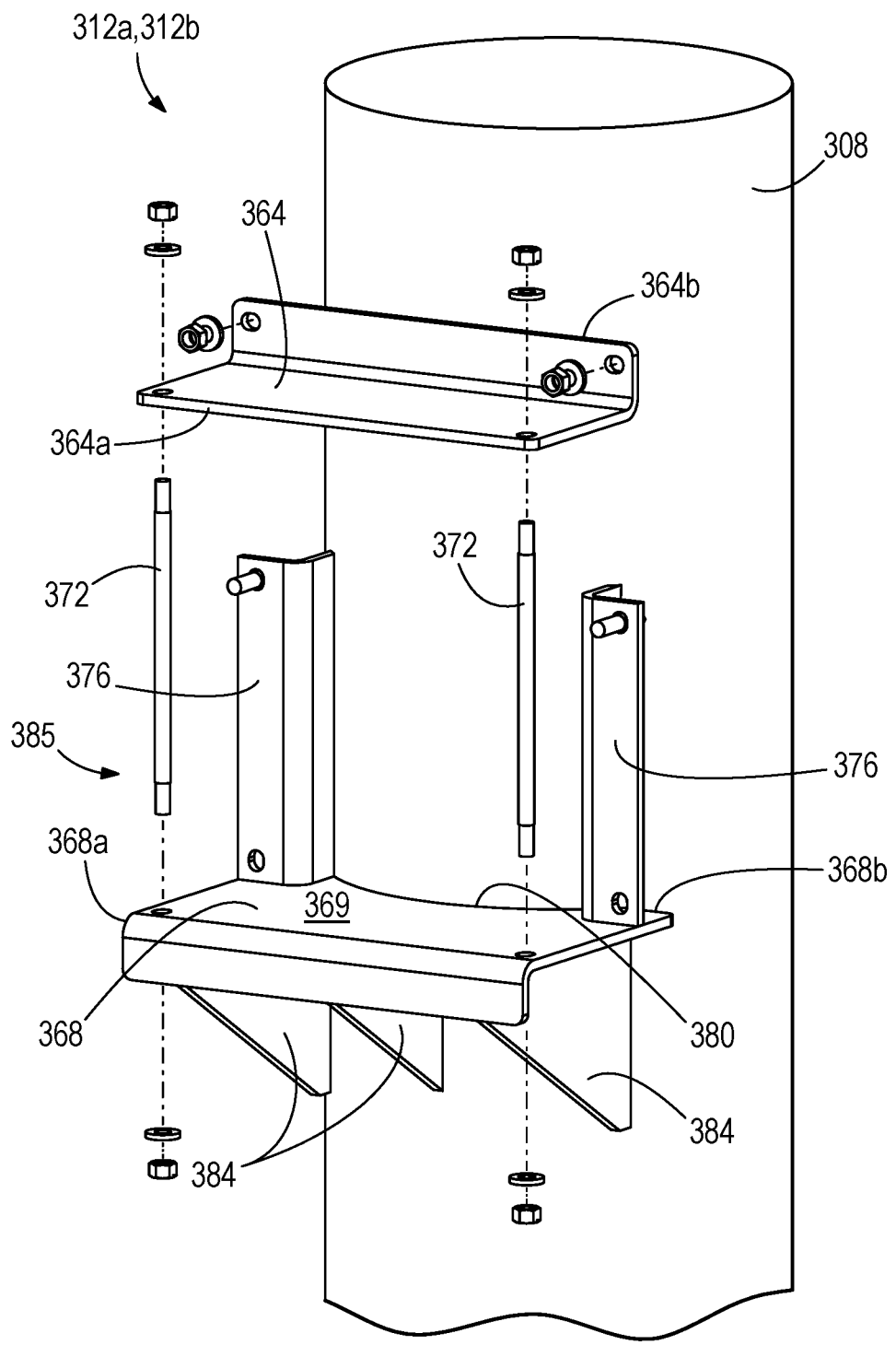
FIG. 11 is an exploded view of the pole mount of FIG. 10.

With reference to FIG. 11, each pole mount 312a, 312b includes a pair of spaced-apart plates 364, 368, a pair of spaced-apart rods 372, and a pair of spaced-apart elongate members 376. Each of the plates 364, 368 have a first end 364a, 368a and a second end 364b, 368b opposite the first end 364a, 368a and configured to face the pole 308. The lower plate 368 is positioned on the pole 308 beneath the upper plate 364. In the illustrated embodiment, the lower plate 368 is welded to the pole 308 while the upper plate 364 is removably coupled to the lower plate 368 by the rods 372, the elongate members 376, and a plurality of fasteners. The lower plate 368 includes a cut-out 380 configured to at least partially receive the pole 308. In the illustrated embodiment, the upper and lower plates 364, 368 each have a depth D along the X-axis that is greater than a depth E of the crossbar 304 along the X-axis (FIG. 9).

As explained in greater detail below, the lower plate 368 provides a surface 369 on which the crossbar 304 may rest during the process of installing the integrated switchgear assembly 300. In other words, the lower plate 368 provides a shelf on which the crossbar 304 may rest during installation. Before the crossbar 304 is installed on the pole mounts 312a, 312b, the lower plate 368 and a plurality of reinforcement plates 384 disposed below the lower plate 368 are welded to the pole 308. The reinforcement plates 384 are coupled to the lower plate 368 opposite the surface 369 and are coupled to the pole 308. In the illustrated embodiment, the pole mount 312a includes three reinforcement plates 384. In other embodiments four or more reinforcement plates are included for each pole mount 312a, 312b. In still other embodiments, two or fewer reinforcement plates are included for each pole mount 312a, 312b. The pair of spaced-apart elongate members 376 extend upwards from the lower plate 368. In some embodiments, the elongate members 376 are also welded to the pole 308. In some embodiments, each elongate member 376 is an L-shaped bracket.

With continued reference to FIG. 11, the pair of spaced-apart rods 372 extend between and are coupled to each of the plates 364, 368 when assembled. Specifically, the rods 372 extend through the upper plate 364 and the lower plate 368 adjacent the first end 364a of the upper plate 364 and the first end 386a of the lower plate 368. When the pole mount 312 is assembled, the elongate members 376 extend between and are coupled to the second end 364b of the upper plate 364 and the second end 386b of the lower plates 368. As explained in greater detail below, the plates 364, 368 are spaced apart to provide a space 385 to receive the crossbar 304 therebetween. Likewise, the elongate members 376 are spaced apart to provide a space in which to receive the pole 308 therebetween.

In an assembled state the upper plate 364 abuts the first surface 306a of the crossbar 304 (FIG. 7) and the lower plate 368 abuts the second surface 306b of the crossbar 304, opposite the first surface 306a (FIG. 12A). In some embodiments, in an assembled state, each of the rods 372 abuts the fourth surface 306d of the crossbar 304 (FIG. 7). Also, in some embodiments, in an assembled state each of the elongate members 376 and the pole 308 abuts the third surface 306c of the crossbar 304, opposite the fourth surface 306d (FIG. 9). In other words, the pole mounts 312a surround the crossbar 304 on all four sides 306a-d when fully assembled (FIGS. 7-9, 12A).

In practice in the field, the poles 308 may be slightly skewed with respect to each other, and/or a spacing between the poles 308, once installed, may differ slightly from a planned spacing. The pole mounts 312a, 312b advantageously provide tolerances that allow for adjustment during installation of the crossbar 304 to the poles 308 along at least two different orthogonal axes (e.g., an X-axis and a Y-axis, illustrated in FIG. 7). For example, the pole mounts 312a, 312b may be rotated about a longitudinal axis of each pole 308 (i.e. an axis parallel to a Z-axis orthogonal to the X- and Y-axes) once the poles 308 are installed in the ground and prior to welding the mounts 312a, 312b to the respective poles. This allows the mounts 312a, 312b to be aligned such that the ends 386a, 386b of the lower plates 368 are co-planar, even if one of the poles 308 is offset from the other pole 308 along the X-axis.

The pole mounts 312a, 312b also permit adjustment of the crossbar 304 relative to the poles 308 along the Y-axis, which, in the illustrated embodiment, is parallel to the longitudinal axis 305 of the crossbar 304. More specifically, the crossbar 304 is slidable along the Y-axis between the upper and lower plates 364, 368 prior to tightening the fasteners provided at the ends of the rods 372. (FIG. 11). Once the fasteners are tightened, the plates 364, 368 clamp the crossbar 304 and inhibit further movement of the crossbar 304 along the Y-axis. In some embodiments, the crossbar 304 is adjustable at least 2.5 inches in either direction along the Y-axis relative to the pole mounts 312a, 312b. In some embodiments, the crossbar 304 is adjustable at least 5 inches in either direction along the Y-axis relative to the pole mounts 312a, 312b. This adjustability allows the poles 308 to be spaced closer or further apart relative to one another along the Y-axis while still permitting secure mounting of the crossbar 304.

In some embodiments, the limits of adjustability along the Y-axis may be defined by flanges 390 coupled to the crossbar 304 on either side of one or both of the crossbar mounts 312a, 312b (e.g., FIG. 12A). The flanges 390 may provide additional lifting points to facilitate installing the crossbar 304 on the poles 308.

Figure 10:
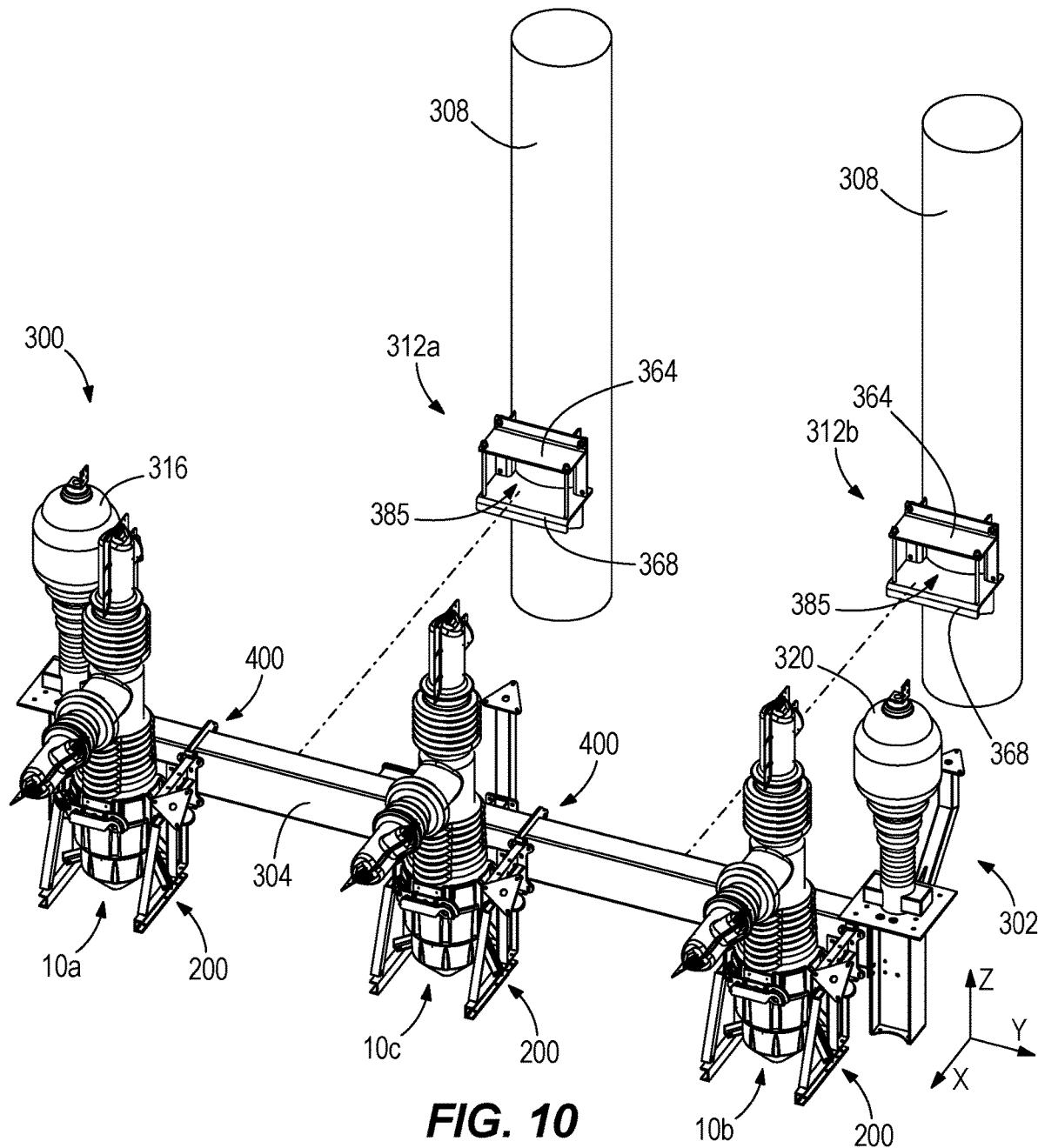
FIG. 10 is an exploded view of the integrated assembly of FIG. 7, illustrating a crossbar exploded from corresponding pole mounts.

Finally, because the pole mounts 312a, 312b are configured to be welded to the poles 308, the pole mounts 312a, 312b can be attached to the poles 308 at any desired height. In other words, the position of each of the pole mounts 312a, 312b relative to the poles 308 is adjustable along a Z-axis orthogonal to each of the X and Y axes (FIG. 10). The pole mounts 312a, 312b can thus be welded to the poles 308 after the poles are installed in the ground to ensure that the pole mounts 312a, 312b are at the same height and that the crossbar 304, when subsequently attached to the pole mounts 312a, 312b, will be level.

Thus, the pole mounts 312a, 312b provide tolerances in each of the X, Y, and Z directions that account for misalignments in the poles 308 that may be encountered during installation of the integrated switchgear assembly 300 in the field.

The integrated assembly 300 may also include one or more electrical accessory components wired to one or more of the reclosers 10a-c. The electrical accessory component(s) may include but are not limited to one or more surge arrestors, power transformers, wildlife protectors, insulators, disconnect switches, control cabinets, or the like.

For example, in the embodiment illustrated in FIGS. 7-9, the integrated assembly 300 includes a first power transformer 316 coupled to the crossbar 304 at a first end of the crossbar 304 and a second power transformer 320 coupled to the crossbar 304 at a second end of the crossbar 304 opposite the first end. The transformers 316, 320 each includes a mounting plate 321 that is flat and permits the transformers 316, 320 to be free-standing when not coupled to the crossbar 304. The mounting plates 321 are welded to beam segments 304a, 304b, which are in turn bolted to the respective ends of the crossbar 304. The beam segments 304a, 304b extend vertically, transverse to the axis 305 of the crossbar 304 and have an I-shaped cross-section in the illustrated embodiment. When coupled to the beam segments 304a, 304b, the mounting plates 321 of the transformers 316, 320 extend parallel to the longitudinal axis 305 of the crossbar 304. The power transformers 316, 320 may be configured to step down the high transmission voltage (e.g., 72.5 kV) from the reclosers 10a-c to a lower voltage (e.g., 120 V). In some embodiments, one or both power transformers 316, 320 may provide power to the controllers of the reclosers 10a-c.

The power transformers 316, 320 may be solid dielectric outdoor power transformers; however, the integrated assembly 300 may additionally or alternatively include other types of power transformers in other embodiments. In addition, the integrated assembly 300 may include a different number of power transformers, or the integrated assembly 300 may not include a power transformer. The power transformers 316, 320 may be also positioned elsewhere within the integrated assembly 300 in other embodiments.

With continued reference to FIGS. 7-9, the illustrated integrated assembly 300 further includes a first group or plurality of surge arrestors 324 and a second group or plurality of surge arrestors 328. The first plurality of surge arrestors 324 may provide lightning and/or surge protection for the first terminals 30 of the respective reclosers 10a-c. The second plurality of surge arrestors 328 may provide lightning and/or surge protection for the second terminals 38 of the respective reclosers 10a-c.

In the illustrated embodiment, each of the first plurality of surge arrestors 324 is mounted on a support arm 332 that extends from the crossbar 304 on an opposite side of the longitudinal axis 305 from the reclosers 10a-c. The support arms 332 may be welded to the crossbar 304 or attached to the crossbar 304 in other ways. In the illustrated embodiment, the support arms 332 are square tubing. Each of the second plurality of surge arrestors 328 is mounted on a support arm 336 that extends from the mounting bracket 200 of the associated recloser 10a-c. The support arms 336 may be welded to the mounting brackets 200 or attached to the mounting brackets 200 in other ways. In the illustrated embodiment, the support arms 336 are circular tubing. Thus, in a preferred embodiment, the interrupters and accessories are all welded to the crossbar 304 without having to drill holes in or penetrate the crossbar 304.

The first plurality of surge arrestors 324 and the second plurality of surge arrestors 328 are positioned on opposite sides of the longitudinal axis 305. (FIG. 9). The surge arrestors 324, 328 are configured to be mounted independently of each other to the integrated switchgear assembly 300 and can be mounted to the mounting brackets 200, the crossbar 304 or other suitable mounting locations on the integrated switchgear assembly 300. The locations of the surge arrestors 324, 328 have been positioned and spaced apart, in the illustrated embodiment, to account for the clearances needed for higher voltage components.

With reference to FIGS. 8 and 9, the illustrated integrated assembly 300 further includes a plurality of wildlife protectors 340 configured to protect the terminals 30, 38 of the reclosers 10a-c. For example, the wildlife protectors 340 may inhibit birds or other animals from making direct contact with the terminals 30, 38. In some embodiments, the wildlife protectors 340 may substantially enclose the associated terminal 30, 38. The wildlife protectors 340 may be removable from the terminals 30, 38 to facilitate making electrical connections with the respective terminals.

With reference to FIGS. 7 and 12, the integrated assembly 300 may further include a grounding pad 394. In the illustrated embodiment, the grounding pad 394 is positioned on the mounting bracket 200. The grounding pads may be positioned in other suitable locations on the integrated switchgear assembly 300 in other embodiments. The grounding pads 394 are positioned for easy access by a technician. In some embodiments, the grounding pad 394 includes a NEMA 2-hole mounting pattern.

Figure 14:
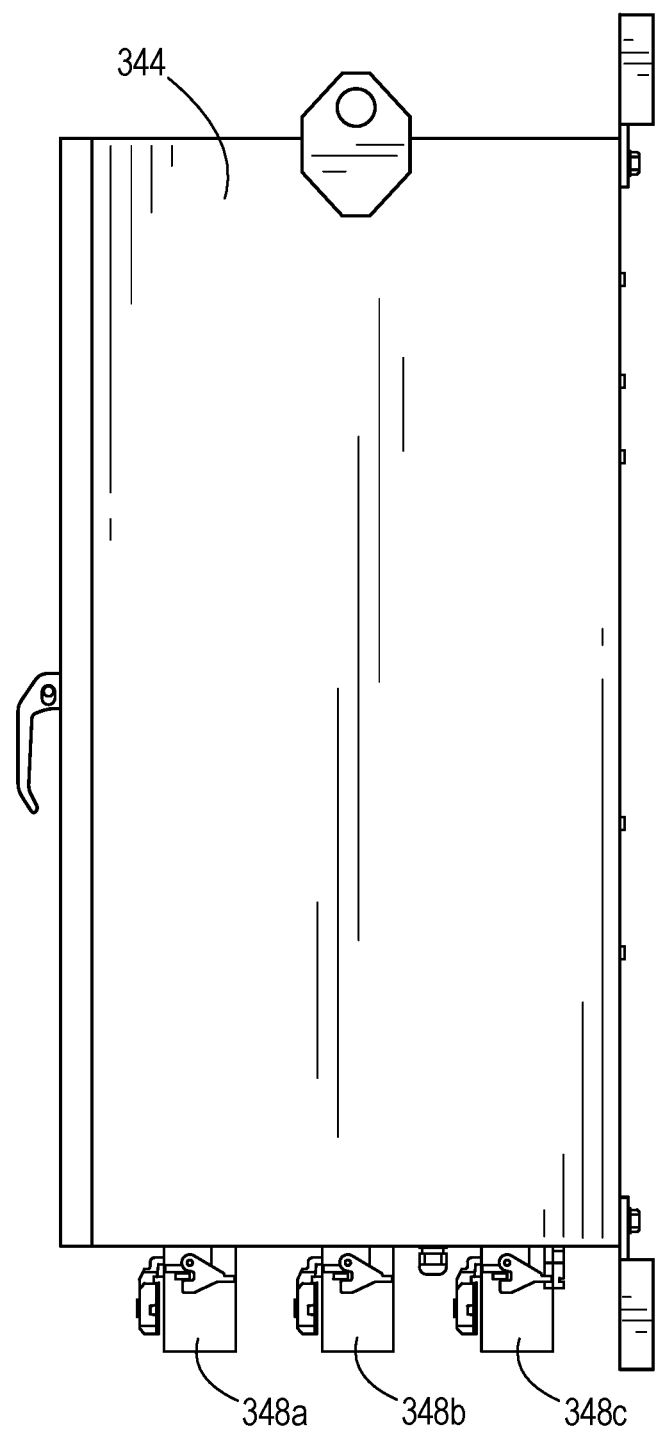
FIG. 14 is a side view of a control cabinet usable with the integrated assembly of FIG. 7.
Figure 17:
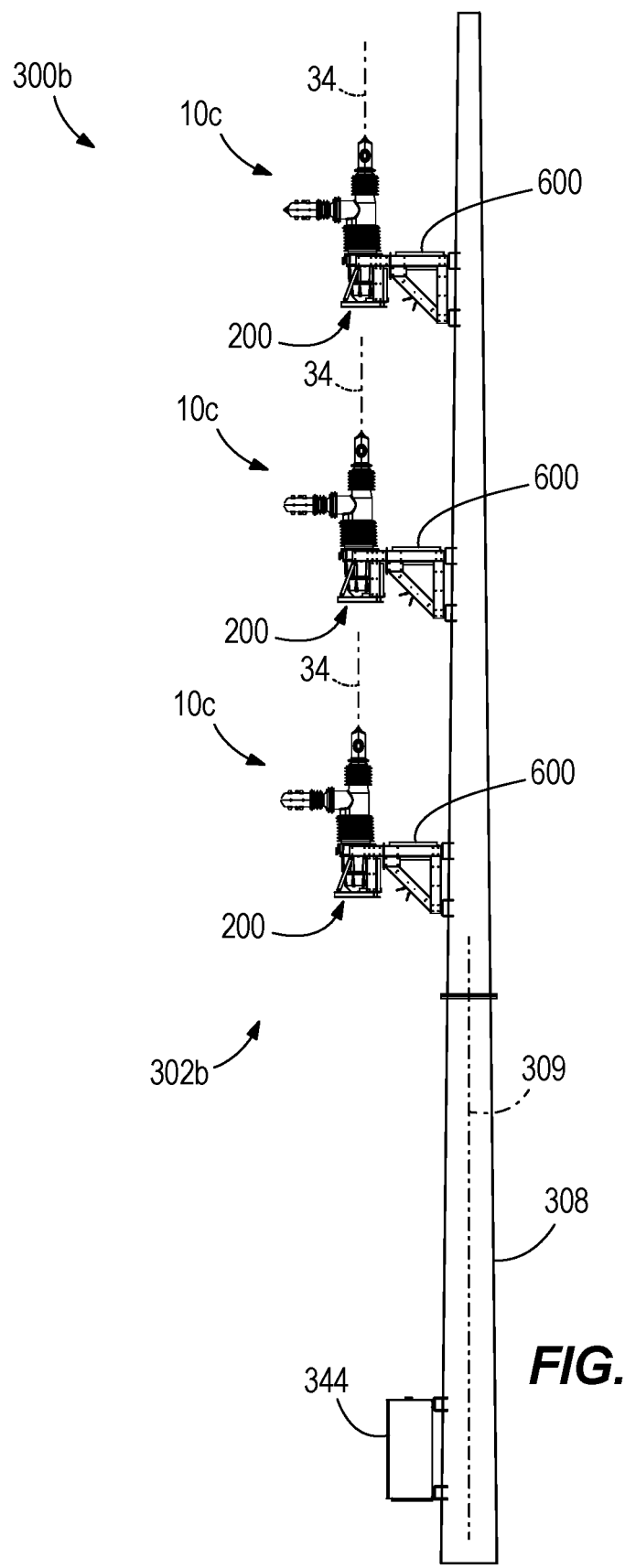
FIG. 17 is a side view of an integrated assembly according to another embodiment of the present disclosure.

The integrated assembly 300 may further include a control cabinet 344 (FIG. 14) coupled to one or both of the poles 308 (e.g., in the manner shown in FIG. 17. The control cabinet 344 may enclose one or more controllers that control operation of the reclosers 10a-c. The illustrated control cabinet 344 includes three cable ports 348a, 348b, 348c. The cable ports 348a, 348b, 348c are configured to receive control cables that extend to the connectors 138 (FIG. 6) of the respective reclosers 10a-c. In this way, connections between the reclosers 10a-c and the controller within the control cabinet 344 can be made quickly and easily by the end-user. In some embodiments, the control cabinet 344 may receive power from one or both of the power transformers 316, 320 to power the controllers within the control cabinet 344.

Referring to FIGS. 7-10, in the illustrated embodiment, the mounting brackets 200, the crossbar 304, the pole mounts 312a, 312b, the crossbar mounts 400, and the support arms 332, 336 are each part of the mounting assembly 302 that is attachable to electrical utility poles 308 to support the reclosers 10a-c and the various electrical accessory components from the poles 308. The mounting assembly 302 allows an end-user to install the integrated assembly 300 on poles 308 at a work site as a single unit, reducing the number of components to integrate on site and the number of connection points to be made on the pole(s) 308. The mounting assembly 302 may also reduce the number of lifts and off-the-ground assembly steps.

The integrated assembly 300 facilitates efficient installation of switchgear, such as the reclosers 10a-c. The integrated assembly 300 advantageously allows for electrical accessory components, including, but not limited to, one or more surge arrestors, power transformers, wildlife protectors, insulators, disconnect switches, and control cabinets to be pre-assembled at the factory and provided to an end-user as a complete kit, ready for attachment to power lines.

For example, a method of assembling an integrated assembly 300 at the factory may include providing a crossbar 304, determining locations for each of a plurality of crossbar mounts 400 along a length of the crossbar 304 based on customer specifications (e.g., line spacing and configuration), and then welding each of the crossbar mounts 400 to the crossbar 304. The method may further include providing three reclosers 10a-c, and coupling each of the three reclosers 10a-c to a respective mounting bracket 200 (FIG. 6). The mounting brackets 200 may then be coupled to the crossbar mounts 400 by aligning the flanges 202 on the mounting brackets 200 with the flanges 416 on the crossbar mounts 400 and fastening the flanges 202, 416 together with a plurality of fasteners (FIG. 12).

The method may further include providing one or more electrical accessories, such as one or more surge arrestors, power transformers, wildlife protectors, insulators, disconnect switches, or the like, and attaching the one or more electrical accessories to the crossbar 304 and/or the mounting brackets 200. Primary wiring connections between each of the components of the integrated assembly 300 may also be made at the factory prior to shipment to the end-user and prior to mounting the integrated assembly 300 (e.g., on poles 308).

In further embodiments, electrical lugs and/or bundles of primary wiring may also be included as part of the integrated assembly 300. This greatly expedites installation of the integrated assembly 300 and reduces commissioning time. In addition, in yet other embodiments, the integrated assembly 300 may be functionally tested as an assembly prior to shipping the integrated assembly 300 to the end-user. As a result, the integrated assembly 300 may advantageously be more reliable than assemblies that are constructed and wired in the field from a variety of different components.

Figure 15:
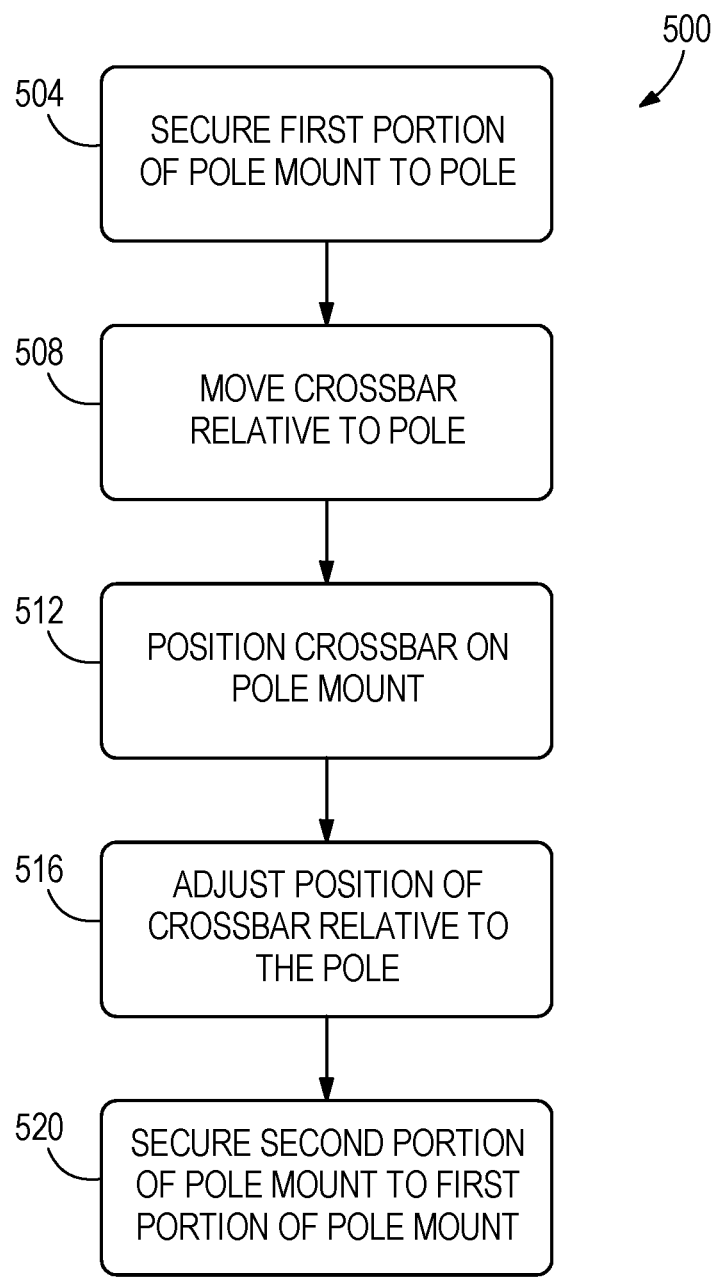
FIG. 15 is a flowchart illustrating a method of installing an integrated assembly according to an embodiment of the present disclosure.

With reference to FIG. 15, a method 500 for installing the integrated assembly 300 on the poles 308 is illustrated. The method 500 may be performed, for example, after assembling the integrated switchgear assembly 300 at the factory as described above, and after the integrated switchgear assembly 300 is shipped to a field location. The method 500 includes securing the pole mounts 312a, 312b to the respective poles 308 (STEP 504). For example, the lower plate 368, the elongated members 376, and the reinforcement plates 384 are first positioned (e.g., rotated) with respect to a longitudinal axis of each of the poles 308 until the ends 386a, 386b of the lower plates 368 of the respective pole mounts 312a, 312b are co-planar. The lower plates 368, elongated members 376, and reinforcement plates 384 are then welded, or otherwise secured, to each pole 308 in STEP 504.

Next, the method 500 includes moving the crossbar 304 relative to the pole 308 with the attached switchgear (e.g., the reclosers 10a-c) and any included electrical accessories mounted to the crossbar 304 (STEP 508). For example, the crossbar 304 is lifted with a crane such that the crossbar 304 moves with respect to the pole 308.

Next, the method 500 includes positioning the crossbar 304 on a first portion of the pole mounts 312a, 312b (e.g., the surface 369 of the lower plate 368) (STEP 512). For example, the crossbar 304 may be set and rested upon the lower plates 368 of the pole mounts 312a, 312b such that the lower plates 368 at least partially support the weight of the crossbar 304 and the attached components. In this sense, the plates 368 act as a shelf to support the crossbar 304 during installation. Next, the method 500 includes adjusting the position of the crossbar 304 relative to the poles 308 (STEP 516). In other words, the crossbar 304 may be slid along the Y-axis to the extent permitted by the pole mount 312a, 312b or otherwise moved by the installer(s) with respect to the poles 308 and the lower plates 368 of the pole mounts 312a, 312b as the crossbar 304 remains supported by the plates 368. In this sense, adjustments to the positioning of the crossbar 304 can occur after the weight of the crossbar 304 is largely being supported by the poles 308 (via the pole mount 312a).

Next, the method 500 includes securing a second portion of each pole mount 312a, 312b (e.g., the upper plate 364) to the first portion of the pole mount 312a (STEP 520). For example, each upper plate 364 is secured to the corresponding lower plate 368 with the pair of spaced-apart rods 372 and is also secured to the elongate members 376. The crossbar 304 is thereby received between the first portion (e.g., upper plate 364) and the second portion (e.g., the lower plate 368) when installed on the pole 308. In other words, the plates 364, 368 are clamped together by the rods 372 to secure the crossbar 304 relative to the pole 308 after adjustments to the crossbar 304 position have been made.

Figure 16:
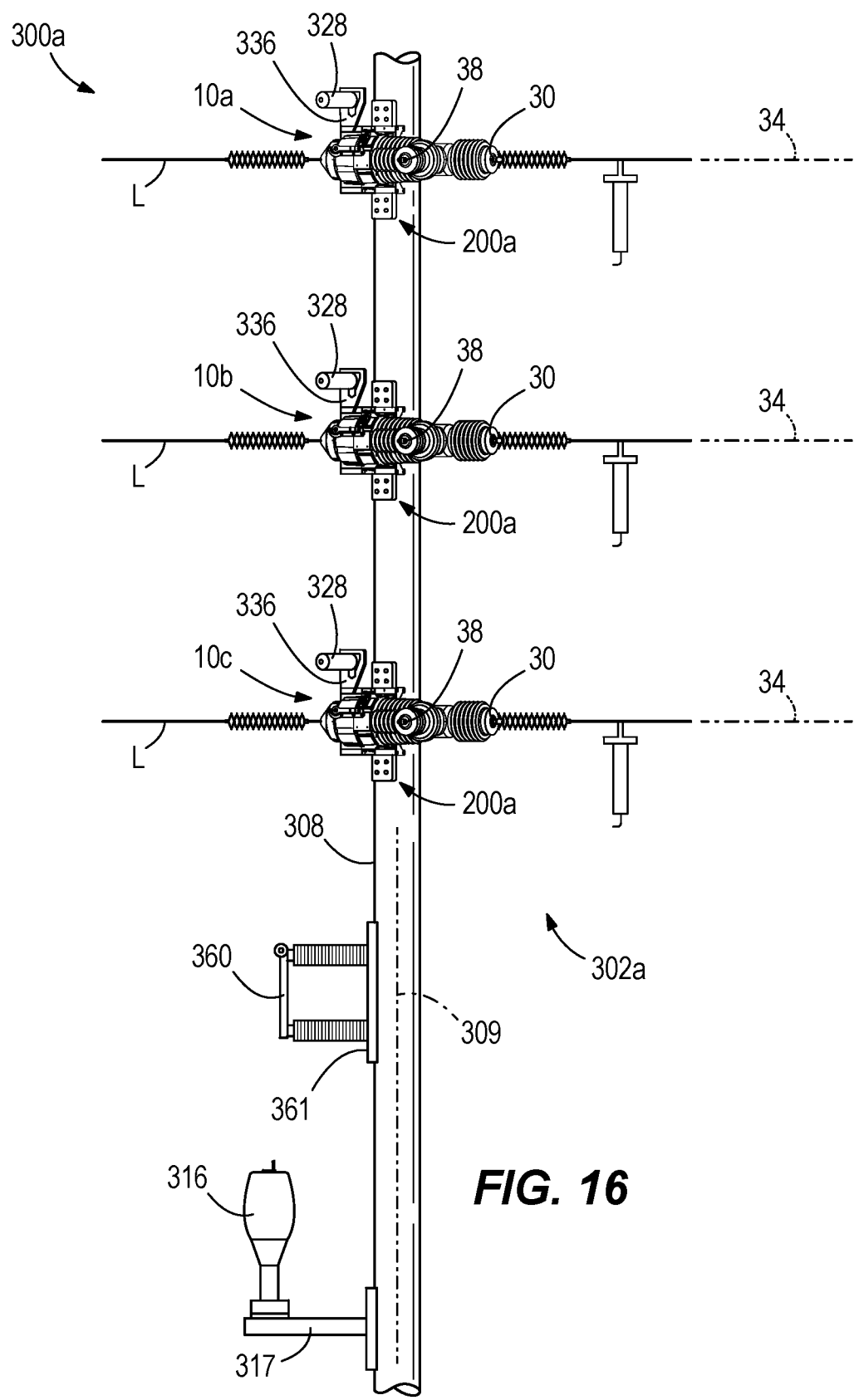
FIG. 16 is a plan view of an integrated assembly according to another embodiment of the present disclosure.

FIG. 16 illustrates an assembly 300a according to another embodiment. The illustrated assembly 300a includes three reclosers 10a, 10b, 10c—each associated with an electrical line L carrying a different phase of a three-phase power transmission system. The reclosers 10a-c may be electronically and/or mechanically ganged together to synchronize operation between the reclosers 10a-c (including, for example, opening and closing the contacts 66, 70 of the reclosers 10a-c).

Each of the reclosers 10a-c of the assembly 300a may be coupled to a pole 308 by a respective mounting bracket 200a in a vertically spaced or stacked arrangement. That is, the reclosers 10a-c may be vertically spaced apart along a longitudinal axis 309 of the pole 308. This arrangement may be referred to as a line-over-line arrangement. In the illustrated embodiment, the mounting brackets 200a are each directly coupled to the pole 308 by fasteners and/or welding, with each of the reclosers 10a-c oriented horizontally. As such, the axis 34 that extends through the first terminal 30 of each recloser 10a-c is oriented generally parallel with the lines L and generally perpendicular to the longitudinal axis 309 of the pole 308. Of course, depending on the orientation of the pole 308, the possible varied orientations of a particular recloser 10a-c relative to the ground may be different from those illustrated in the exemplary embodiment of FIG. 16. In other embodiments, one or more of the reclosers 10a-c may be mounted with the axis 42 at different orientations, by rotating the recloser(s) 10a-c about the axis 34 relative to the respective mounting bracket 200a. The mounting brackets 200a thus advantageously provide the flexibility to mount the reclosers 10a-c on the pole 308 in a variety of different orientations to best suit a particular installation.

The assembly 300a may include one or more electrical accessory components wired to one or more of the reclosers 10a-c. The electrical accessory component(s) may include but are not limited to one or more surge arrestors, power transformers, wildlife protectors, insulators, disconnect switches, control cabinets, or the like.

For example, in the embodiment illustrated in FIG. 16, the assembly 300a includes a power transformer 316 coupled the pole 308 via a transformer mount 317. In some embodiments, the transformer mount 317 may space the power transformer 316 a distance away from the pole 308 to provide clearance based on the operating voltage of the power transformer 316. The power transformer 316 may be configured to step down the high transmission voltage (e.g., 72.5 kV) from the reclosers 10a-c to a lower voltage (e.g., 120 V). In some embodiments, the power transformer 316 may provide power to the controllers of the reclosers 10a-c.

The power transformer 316 may be a solid dielectric outdoor power transformer; however, the assembly 300a may additionally or alternatively include other types of power transformers in other embodiments. In other embodiments, the assembly 300a may include a different number of power transformers, or the assembly 300a may not include a power transformer. The illustrated assembly 300a also includes a fuse or disconnect switch 360 with a switch mount 361 that is coupled to the pole 308. The disconnect switch 360 may be configured to disconnect power from the reclosers 10a-c to the power transformer 316 in some embodiments.

With continued reference to FIG. 16, the illustrated assembly 300a further includes a plurality of surge arrestors 328 that may provide lightning and/or surge protection for the respective reclosers 10a-c. In the illustrated embodiment, each of the plurality of surge arrestors 328 is mounted on a support arm 336 that extends from the mount 200 of the associated recloser 10a-c. In other embodiments, however, the surge arrestors 328 may be positioned elsewhere within the assembly 300a, and in some embodiment, the assembly 300a may additionally or alternatively include one or more surge arrestors 328 mounted support arms 336 that extend directly from the pole 308.

In the illustrated embodiment, the mounting brackets 200, the transformer mount 317, the switch mount 361, and the support arms 336 are each part of a mounting assembly 302a that is attachable to an electrical utility pole 308 to support the reclosers 10a-c and the various electrical accessory components from the pole 308. Because the assembly 300a may be provided with all of its components as a kit, the mounting assembly 302a of the assembly 300a may be already configured to provide the electrical components of the assembly 300a with required clearances. In some embodiments, pre-sized wires may be provided together with the integrated assembly to facilitate electrically connecting the electrical components of the assembly 300a after the mounting assembly 302a is attached to the pole 308.

Thus, the present disclosure advantageously provides an assembly 300a that facilitates efficient installation switchgear, such as the reclosers 10a-c. The assembly 300a advantageously allows for electrical accessory components, including but not limited to one or more surge arrestors, power transformers, wildlife protectors, insulators, disconnect switches, and control cabinets to be pre-assembled at the factory and provided to an end-user as a complete kit, ready for attachment to power lines. This greatly expedites installation of the assembly 300a. In addition, in some embodiments, the assembly 300a may be functionally tested as an assembly prior to shipping the assembly 300a to the end-user. As a result, the assembly 300a may be more reliable than assemblies that are constructed and wired in the field from a variety of different components.

With reference to FIGS. 17-20, an assembly 300b according to another embodiment is illustrated. Like the assembly 300a described above with reference to FIG. 16, the illustrated assembly 300a includes three reclosers 10a, 10b, 10c—each coupled to a pole 308 by a respective mounting bracket 200 in a vertically spaced or stacked arrangement. That is, the reclosers 10a-c may be spaced apart along a longitudinal axis 309 of the pole 308. In the illustrated embodiment, mounting brackets 200 are coupled to the pole 308 such that each of the reclosers 10a-c is oriented vertically, with the axis 34 that extends through the first terminal 30 of each recloser 10a-c oriented generally parallel with the longitudinal axis 309 of the pole 308.

Figure 18:
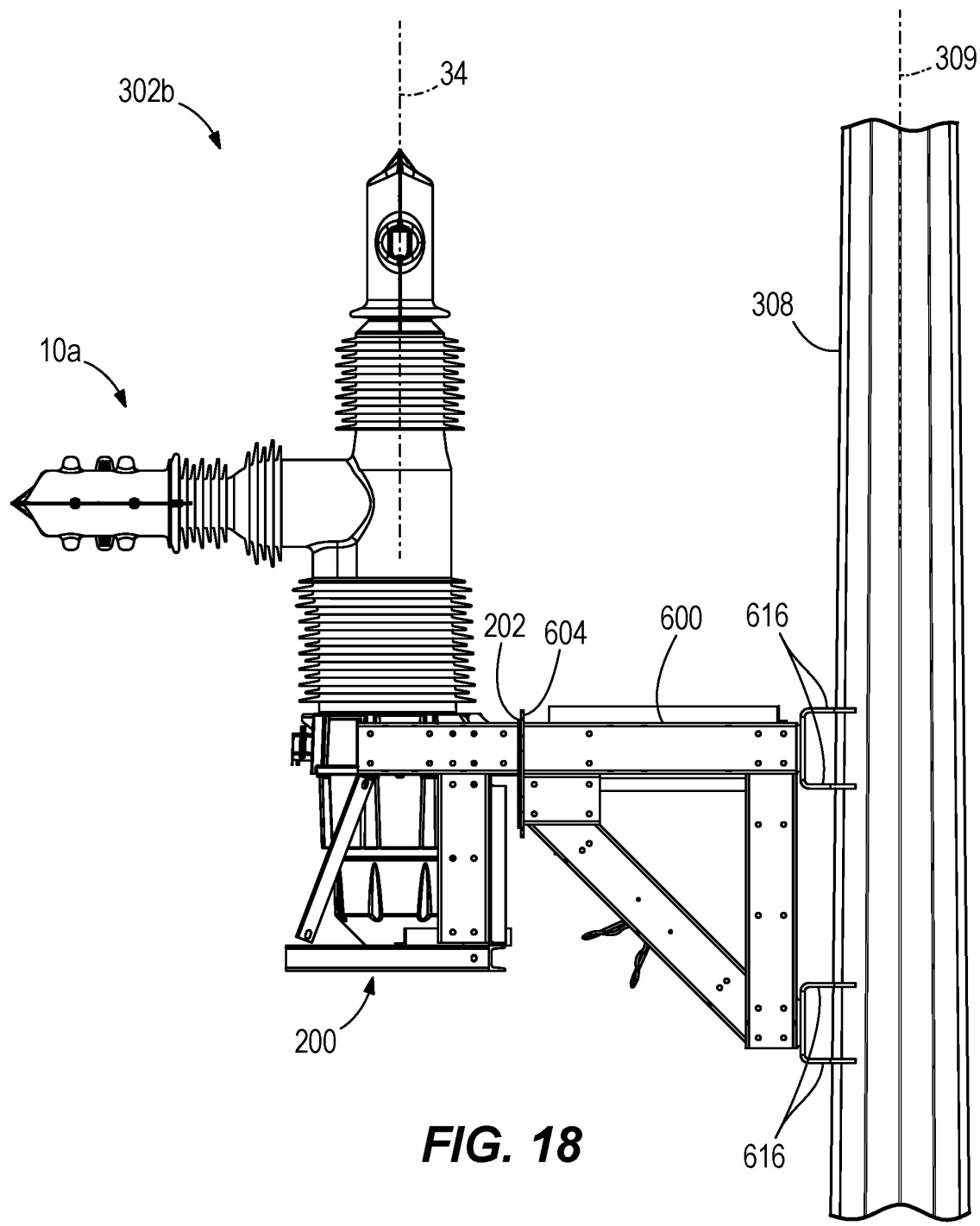
FIG. 18 is a partial side view of the integrated assembly of FIG. 17, showing the recloser of FIG. 1 coupled to a bracket in a vertical orientation.
Figure 19:
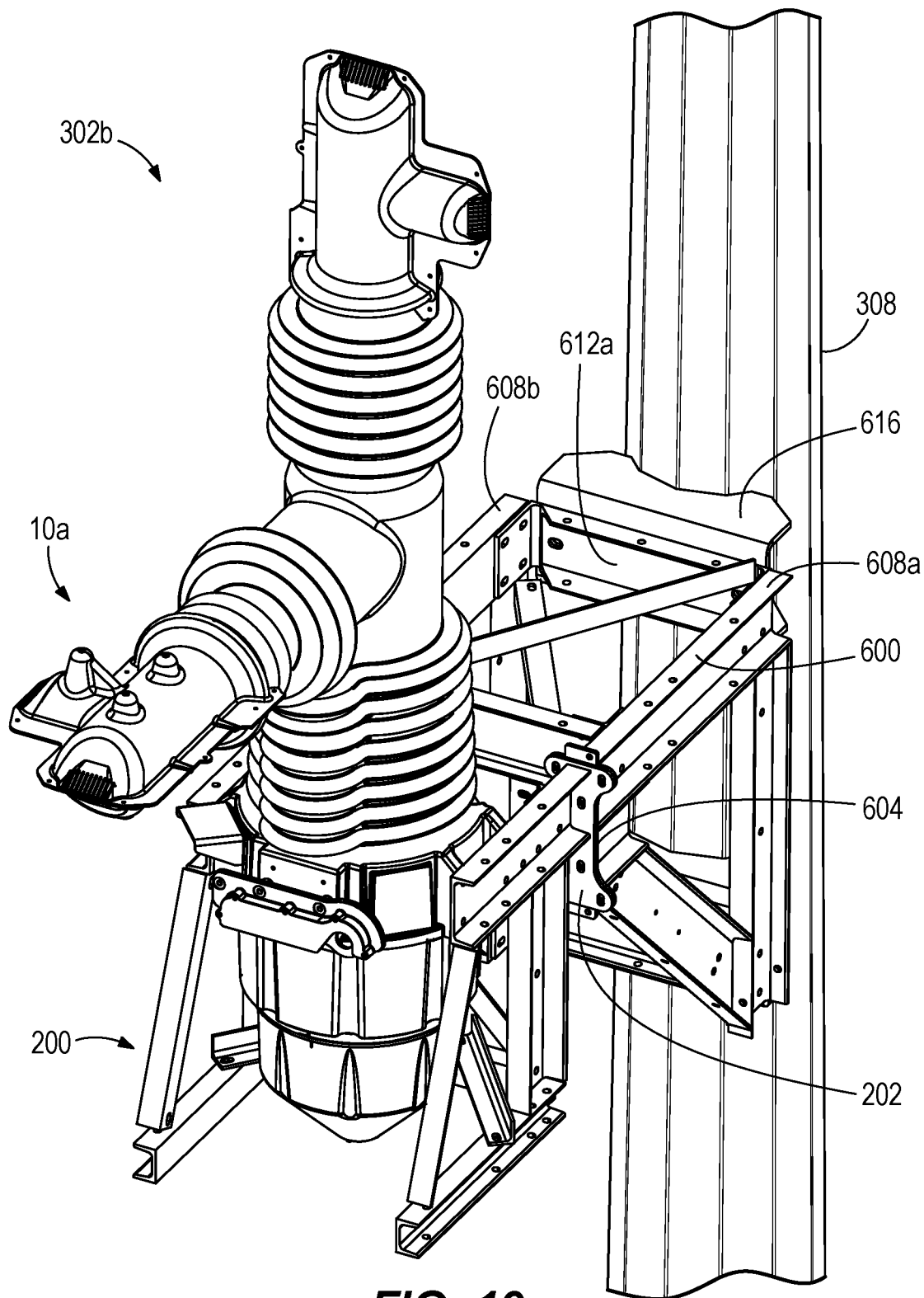
FIG. 19 is a perspective view of the integrated assembly of FIG. 18.
Figure 20:
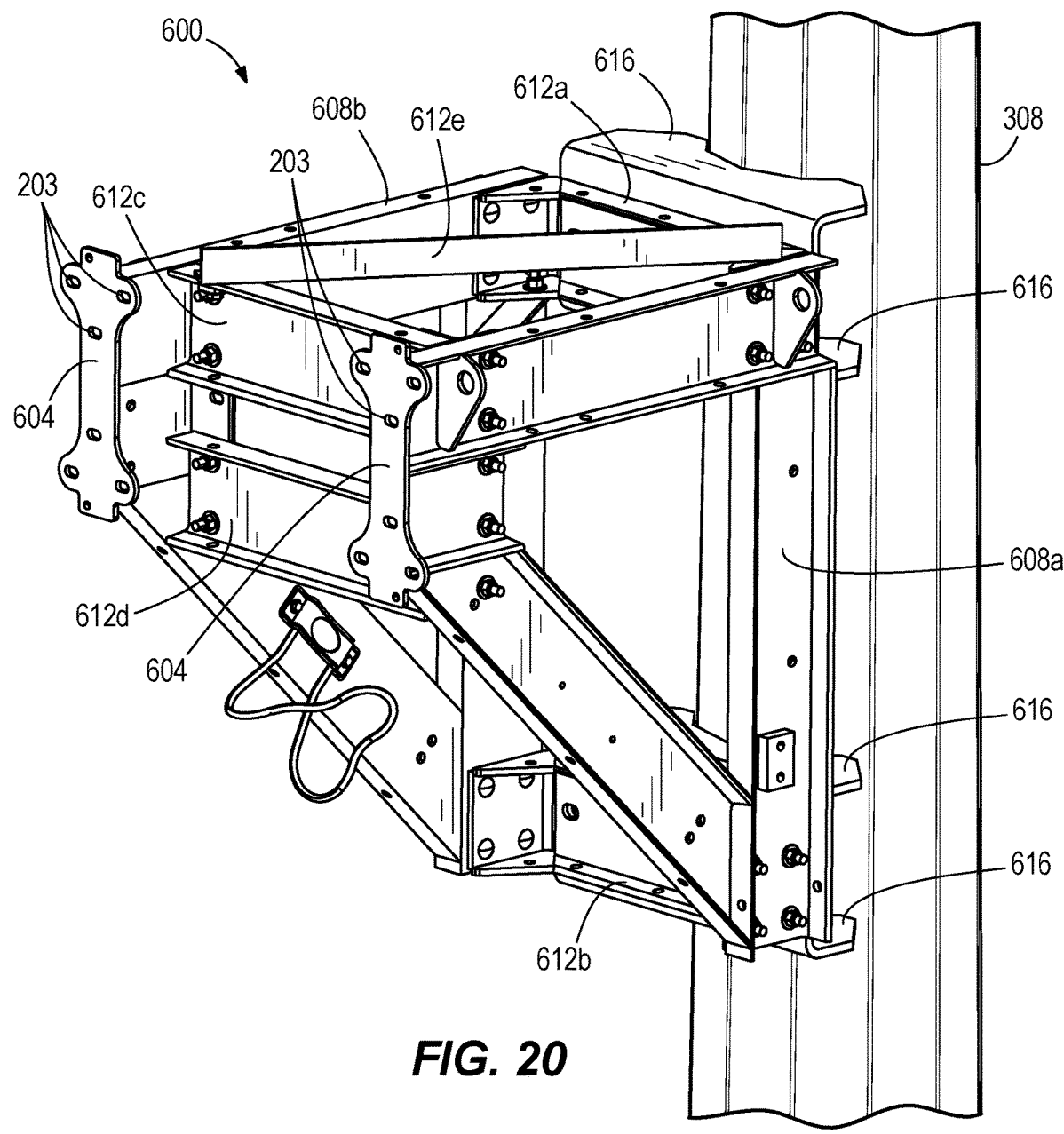
FIG. 20 is a perspective view of the bracket of FIG. 18.

With continued reference to FIGS. 18-20, each one of the reclosers 10a-10c is coupled to the pole 308 by a mounting assembly 302b including a pole mount bracket 600. In the illustrated embodiment, the mounting bracket 200 is fastened to the pole mount bracket 600, which itself is secured to the pole 308, via a weld for example (FIG. 20). The pole mount bracket 600 includes a flange 604 similar to the flange 416 and is configured to be coupled to the flange 202 of the mounting bracket 200. In the illustrated embodiment, the flange 604 includes a plurality of slotted holes 203 that correspond to the slotted holes 203 on the flange 202. In other words, the mounting bracket 200 includes the flange 202 that can be secured to either one of a crossbar mount 400 that is configured to support the mounting bracket 200 on the crossbar 304 (FIG. 7) or the pole mount bracket 600 configured to support the mounting bracket 200 on the pole 308 in a vertical configuration (FIG. 17). As such, the recloser 10a and the mounting bracket 200 are modular, interchangeable, and can be mounted in either a vertically-spaced or line-over-line configuration (e.g., FIG. 17), or a laterally-spaced or side-by-side configuration (e.g., FIG. 7). Specifically, the mounting bracket 200 is secured to the pole mount bracket 600 when the recloser 10a is mounted to the pole 308 in a vertically-spaced or line-over-line configuration and the mounting bracket 200 is secured to the crossbar mount 400 when the recloser 10a is mounted to the pole 308 in a laterally-spaced or side-by-side configuration.

With continued reference to FIG. 20, the pole mount bracket 600 includes a pair of the flanges 604 with each one coupled at their lower end to a triangular-shaped side frame 608a, 608b. The two side frames 608 are spaced apart and are coupled together by various cross members 612a-612e. The pole mount bracket 600 is coupled to the pole 308 by a welding process, for example. In some embodiments, cross members (e.g., the cross member 612a and the cross member 612b) each includes a plate 616 that are welded to the pole 308.

Although the disclosure has been described in detail with reference to certain preferred embodiments, variations and modifications exist within the scope and spirit of one or more independent aspects of the disclosure as described.

Various features and advantages of the disclosure are set forth in the following claims.

What is claimed is:

1. An integrated assembly comprising:
a switchgear apparatus configured for operation at voltages up to 72.5 kV;
a mount assembly configured for coupling to a pole and to support the switchgear apparatus from the pole, the mount assembly including
a crossbar,
a pole mount configured for coupling to the pole and to be secured to the crossbar at different positions along a length of the crossbar,
a mounting bracket configured to support the switchgear apparatus on the crossbar, and
a pair of crossbar mounts configured to be secured to the mounting bracket for supporting the mounting bracket on the crossbar at different positions along the length of the crossbar, wherein each crossbar mount of the pair of crossbar mounts comprises a first arm having a length extending in a plane, a second arm spaced apart from the first arm and having a length extending in the plane and parallel to the first arm, a third arm extending between and coupled to a distal end of each of the first and second arms, and a flange extending between and coupled to a proximal end of each of the first and second arms, the flange configured for coupling to the mounting bracket, and the flange extending parallel to the third arm, wherein the first, second, and third arms and the flange are positioned to form an enclosed space to receive the crossbar.

2. The integrated assembly of claim 1, wherein each crossbar mount of the pair of crossbar mounts include a support channel coupled to the flange.

3. The integrated assembly of claim 2, wherein the support channel is positioned between the flange and the crossbar.

4. The integrated assembly of claim 3, wherein in an assembled state of the integrated assembly a rib on the support channel of each crossbar mount of the pair of crossbar mounts abuts a proximal surface of the crossbar.

5. The integrated assembly of claim 1, wherein the flange of each crossbar mount of the pair of crossbar mounts is configured to be bolted to a flange on the mounting bracket.

6. The integrated assembly of claim 1, wherein the switchgear apparatus includes
a main housing,
a first terminal electrically coupled to one of a movable contact and a stationary contact, the first terminal extending from the main housing along a first axis,
a mounting head configured to be coupled to the main housing in a plurality of different orientations about the first axis and comprising a plurality of pairs of mounting bosses, wherein each pair of the plurality of pairs of mounting bosses is spaced apart from each of the other pairs of the plurality of pairs of mounting bosses about a perimeter of the mounting head, and wherein each pair of the plurality of pairs of mounting bosses is configured to be coupled to the mounting bracket, and
wherein the mounting bracket includes a first pair of mounting bosses coupled to a first arm, a second pair of mounting bosses coupled to a second arm, and a third pair of mounting bosses coupled to a backing frame, and
wherein the mounting head and the mounting bracket are each configured such that the mounting head can be selectively coupled to the mounting bracket to vary an orientation of the first terminal relative to the mounting bracket between a first orientation in which the first terminal extends from the mounting bracket in a first direction and a second orientation in which the first terminal extends from the mounting bracket in a second direction different from the first direction.

7. The integrated assembly of claim 1, wherein the pole mount comprises a pair of spaced-apart plates, each plate having a first end and a second end opposite the first end, a pair of spaced-apart rods extending between and coupled to each plate of the pair of spaced-apart plates adjacent the first end of each plate, a pair of spaced-apart L-shaped elongate members extending between and coupled to each plate of the pair of spaced-apart plates adjacent the second end of each plate, wherein the pair of spaced-apart plates are spaced-apart from each other to provide a space to receive the crossbar therebetween.

8. The integrated assembly of claim 1, wherein the switchgear apparatus is a first switchgear apparatus and the mounting bracket is a first mounting bracket, wherein the integrated assembly includes a second switchgear apparatus and the mount assembly includes a second mounting bracket to support the second switchgear apparatus on the crossbar,
wherein the pair of crossbar mounts is a first pair of crossbar mounts and the mount assembly includes a second pair of crossbar mounts configured to be secured to the second mounting bracket for supporting the second mounting bracket on the crossbar at different positions along the length of the crossbar,
wherein the integrated assembly includes a third switchgear apparatus and the mount assembly includes a third mounting bracket to support the third switchgear apparatus on the crossbar and a third pair of crossbar mounts configured to be secured to the third mounting bracket for supporting the third mounting bracket on the crossbar at different positions along the length of the crossbar,
wherein each crossbar mount of the second and third pairs of crossbar mounts comprises a first arm having a length extending in a plane, a second arm spaced apart from the first arm and having a length extending in the plane and parallel to the first arm, a third arm extending between and coupled to a distal end of each of the first and second arms, and a flange extending between and coupled to a proximal end of each of the first and second arms, the flange configured for coupling to one of the second and third mounting brackets, and, the third arm extending parallel to the flange, wherein the first, second, third arms, and the flange are positioned to form an enclosed space to receive the crossbar, and
wherein each of the second and third switchgear apparatus is configured for operation at voltages up to 72.5 kV.

9. The integrated assembly of claim 8, wherein the pole is a first pole and the pole mount is a first pole mount,
wherein the mount assembly includes a second pole mount configured for coupling to a second pole and to be secured to the crossbar at different positions along the length of the crossbar,
wherein the first pole mount is positioned between the first switchgear apparatus and the second switchgear apparatus along the length of the crossbar, and
wherein the second pole mount is positioned between the second switchgear apparatus and the third switchgear apparatus along the length of the crossbar, and
wherein the first switchgear apparatus, the second switchgear apparatus, and the third switchgear apparatus are secured to the crossbar in a spaced relationship such that a center of gravity of the mount assembly is between the first pole and the second pole.

10. The integrated assembly of claim 8, wherein the first, second, and third switchgear apparatuses are operatively associated with selected electrical accessories supported on the crossbar for attaching the mount assembly as a single unit to the first and second poles.

11. The integrated assembly of claim 10, wherein each of the first, second, and third switchgear apparatus and the selected electrical accessories are wired to provide required clearances for attaching the mount assembly as a single unit to the first and second poles.

12. The integrated assembly of claim 8, wherein the first, second, and third switchgear apparatuses are supported on the crossbar as an assembled wired kit for attaching the mount assembly as a single unit to the first and second poles.

13. An integrated assembly comprising:
a switchgear apparatus configured for operation at voltages up to 72.5 kV;
a mount assembly configured for coupling to a pole and configured to support the switchgear apparatus from the pole, the mount assembly including
a crossbar,
a mounting bracket configured to support the switchgear apparatus on the crossbar;
a pair of crossbar mounts configured to be secured to the mounting bracket for supporting the mounting bracket on the crossbar at different positions along a length of the crossbar, and
a pole mount configured for coupling to the pole and to be secured to the crossbar at different positions along the length of the crossbar, wherein the pole mount comprises a pair of spaced-apart plates each having a first end and a second end opposite the first end, a pair of spaced-apart rods extending between and coupled to each plate of the pair of spaced-apart plates adjacent the first end of each plate, a pair of spaced-apart elongate members extending between and coupled to each plate of the pair of spaced-apart plates adjacent the second end of each plate, wherein the pair of spaced-apart plates is spaced apart to provide a space to receive the crossbar therebetween and the pair of spaced-apart elongate members is spaced apart to provide a space to receive the pole therebetween.

14. The integrated assembly of claim 13, wherein in an assembled state of the integrated assembly a first plate of the pair of spaced-part plates abuts a first surface of the crossbar and a second plate of the pair of spaced-apart plates abuts a second surface of the crossbar opposite the first surface, each rod of the pair of spaced-apart rods abuts a third surface of the crossbar, and each elongate member of the pair of spaced-apart elongate members abuts a fourth surface of the crossbar opposite the third surface.

15. The integrated assembly of claim 13, wherein in an assembled state of the integrated assembly a pair of spaced-apart reinforcement plates is coupled to one of the plates of the pair of spaced-apart plates opposite the crossbar, and wherein one of the plates of the pair of spaced-apart plates includes a cut-out configured to receive a portion of the pole.

16. A method of installing an integrated switchgear assembly on a pole, the method comprising:
providing a mount assembly for coupling to the pole and to support a switchgear apparatus from the pole, the mount assembly including a crossbar and a pole mount configured for coupling to the pole and to be secured to the crossbar at different positions along a length of the crossbar, wherein the pole mount comprises a pair of spaced-apart plates each having a first end and a second end opposite the first end, a pair of spaced-apart rods extending between and coupled to each plate of the pair of spaced-apart plates adjacent the first end of each plate, a pair of spaced-apart elongate members extending between and coupled to each plate of the pair of spaced-apart plates adjacent the second end of each plate, wherein the pair of spaced-apart plates is spaced apart to provide a space to receive the crossbar therebetween and the pair of spaced-apart elongate members is spaced apart to provide a space to receive the pole therebetween;
securing a first portion of the pole mount to the pole;
moving the crossbar relative to the pole, wherein the switchgear apparatus is mounted to the crossbar;
positioning the crossbar on the first portion of the pole mount such that at least a portion of the weight of the crossbar is supported by the first portion of the pole mount;
adjusting the position of the crossbar relative to the pole;
securing a second portion of the pole mount to the first portion of the pole mount, wherein the crossbar is received between the first portion and the second portion when installed on the pole.

17. The method of claim 16, wherein adjusting the position of the crossbar relative to the pole includes moving the crossbar relative to the first portion of the pole mount.

18. The method of claim 16, wherein the pole mount is a first pole mount and the pole is a first pole, the method further includes securing a first portion of a second pole mount to a second pole and positioning the crossbar on the first portion of the second pole mount.

19. The method of claim 16, wherein the switchgear apparatus is a first switchgear apparatus, and wherein a second switchgear apparatus and a third switchgear apparatus are mounted to the crossbar before the crossbar is positioned on the first portion of the pole mount.

20. The method of claim 16, further including adjusting a position of the pole mount by rotating the pole mount about a longitudinal axis of the pole.

* * * * *